US010703927B2

(12) United States Patent
Ali et al.

(10) Patent No.: US 10,703,927 B2
(45) Date of Patent: Jul. 7, 2020

(54) ADHESION PROMOTING AND/OR DUST SUPPRESSION COATING

(71) Applicant: 3M INNOVATIVE PROPERTIES COMPANY, St. Paul, MN (US)

(72) Inventors: Mahfuza B. Ali, Mendota Heights, MN (US); Susannah C. Clear, Hastings, MN (US); Terry R. Hobbs, Stillwater, MN (US); Jeffry L. Jacobs, Hastings, MN (US); Hae-Seung Lee, Woodbury, MN (US); Mary Lou Morris, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 15/302,870

(22) PCT Filed: Apr. 10, 2015

(86) PCT No.: PCT/US2015/025262
§ 371 (c)(1),
(2) Date: Oct. 7, 2016

(87) PCT Pub. No.: WO2015/157612
PCT Pub. Date: Oct. 15, 2015

(65) Prior Publication Data
US 2017/0029649 A1 Feb. 2, 2017

Related U.S. Application Data

(60) Provisional application No. 61/977,970, filed on Apr. 10, 2014.

(51) Int. Cl.
| | |
|---|---|
| *C09D 133/00* | (2006.01) |
| *C09D 133/06* | (2006.01) |
| *C09D 183/06* | (2006.01) |
| *C08L 83/08* | (2006.01) |
| *C08L 83/06* | (2006.01) |
| *C09D 183/08* | (2006.01) |
| *C08F 220/18* | (2006.01) |
| *C08F 255/10* | (2006.01) |
| *C09D 109/00* | (2006.01) |
| *C09D 133/08* | (2006.01) |
| *C09J 109/00* | (2006.01) |
| *C09J 133/08* | (2006.01) |
| *E04D 1/20* | (2006.01) |
| C08G 77/28 | (2006.01) |
| C08G 77/18 | (2006.01) |
| C08L 95/00 | (2006.01) |
| C08G 77/14 | (2006.01) |
| E04D 1/00 | (2006.01) |

(52) U.S. Cl.
CPC ........ *C09D 133/068* (2013.01); *C08F 220/18* (2013.01); *C08F 255/10* (2013.01); *C08L 83/06* (2013.01); *C08L 83/08* (2013.01); *C09D 109/00* (2013.01); *C09D 133/08* (2013.01); *C09D 183/06* (2013.01); *C09D 183/08* (2013.01); *C09J 109/00* (2013.01); *C09J 133/08* (2013.01); *E04D 1/20* (2013.01); C08F 220/1808 (2020.02); C08G 77/14 (2013.01); C08G 77/18 (2013.01); C08G 77/28 (2013.01); C08L 95/00 (2013.01); E04D 2001/005 (2013.01)

(58) Field of Classification Search
CPC ............. C09D 133/068; C09D 133/08; C09D 109/00; C09D 183/06; C09D 183/08; C09D 195/00; C09J 109/00; C09J 133/08; E04D 2001/005; E04D 1/20; C08F 2220/1858; C08F 220/18; C08F 255/10; C08F 220/1808; C08G 77/18; C08G 77/14; C08G 77/28; C08L 95/00; C08L 83/08; C08L 83/06; C08L 2205/02; C08L 33/08; C08K 5/372; C08K 9/04; C08K 9/02
USPC ........................................................ 428/413
See application file for complete search history.

(56) References Cited

U.S. PATENT DOCUMENTS

| | | | |
|---|---|---|---|
| 2,461,971 | A | 2/1949 | Fischer |
| 2,677,679 | A | 5/1954 | Barney |
| 2,768,150 | A | 10/1956 | Millar |
| 3,194,671 | A | 7/1965 | Yavorsky |
| 3,223,577 | A | 12/1965 | Plueddemann |
| 3,528,842 | A | 9/1970 | Skadulis |
| 3,752,696 | A | 8/1973 | Beyard |
| 4,038,096 | A | 7/1977 | Graf |

(Continued)

FOREIGN PATENT DOCUMENTS

| | | |
|---|---|---|
| CN | 1358816 A | 7/2002 |
| CN | 101638451 | 2/2010 |

(Continued)

OTHER PUBLICATIONS

CAS No. 40372-72-3, Nov. 16, 1984. (Year: 1984).*

(Continued)

Primary Examiner — Douglas J McGinty

(57) ABSTRACT

An adhesion promoter coating composition includes an oligomeric alkylalkoxysiloxane and a compound comprising an electrophile moiety and an alkoxysilyl moiety. The electrophile moiety may contain a sulfide functional group, for example. A dust suppression coating composition includes an acrylic polymer comprising a quaternary ammonium moiety; and an oligomeric alkylalkoxysiloxane. The coating composition may be applied to roofing granules, and/or asphaltic compositions, among other things.

17 Claims, 1 Drawing Sheet

(56) References Cited

U.S. PATENT DOCUMENTS

| | | | |
|---|---|---|---|
| 4,053,076 A | 10/1977 | Vogel | |
| 4,130,690 A | 12/1978 | Lien | |
| 4,135,014 A | 1/1979 | Salensky | |
| 4,219,377 A | 8/1980 | Albrecht | |
| 4,292,371 A | 9/1981 | Marzocchi | |
| 5,064,719 A | 11/1991 | Den Hartog | |
| 5,128,391 A | 7/1992 | Shustack | |
| 5,190,932 A | 3/1993 | Dhein | |
| 5,209,775 A | 5/1993 | Bank | |
| 5,373,047 A | 12/1994 | Schnelle | |
| 5,639,846 A | 6/1997 | Shustack | |
| 5,709,949 A | 1/1998 | Chen | |
| 5,932,757 A | 8/1999 | Standke | |
| 5,998,536 A | 12/1999 | Bertry | |
| 6,034,174 A | 3/2000 | Steedman | |
| 6,063,556 A | 5/2000 | Valsecchi | |
| 6,071,990 A | 6/2000 | Yip | |
| 6,140,419 A | 10/2000 | Barglik-Chory | |
| 6,214,530 B1 | 4/2001 | Morrison | |
| 6,300,048 B1 | 10/2001 | Puppo | |
| 6,358,612 B1 | 3/2002 | Bier | |
| 6,440,541 B1 | 8/2002 | Humphrey | |
| 6,537,672 B1 | 3/2003 | Dittfurth | |
| 6,569,520 B1 | 5/2003 | Jacobs | |
| 6,613,755 B2 | 9/2003 | Peterson | |
| 6,627,682 B1 | 9/2003 | Chaves | |
| 6,713,586 B2 | 3/2004 | Greene | |
| 6,730,240 B2 | 5/2004 | Arimoto | |
| 6,797,764 B2 | 9/2004 | Sagiv | |
| 6,881,701 B2 | 4/2005 | Jacobs | |
| 7,057,000 B2 | 6/2006 | Roesler | |
| 7,120,343 B2 | 10/2006 | Castellani | |
| 7,125,601 B1 | 10/2006 | Pinault | |
| 7,193,026 B2 | 3/2007 | Itagaki | |
| 7,205,052 B2 | 4/2007 | Hart | |
| 7,459,167 B1 | 12/2008 | Sengupta | |
| 7,534,820 B2 | 5/2009 | Kohno | |
| 7,682,542 B2 | 3/2010 | Chen | |
| 7,732,552 B2 | 6/2010 | Lejeune | |
| 7,764,855 B2 | 7/2010 | Roba | |
| 7,905,950 B2 | 3/2011 | Ito | |
| 7,951,239 B2 | 5/2011 | Trumbore | |
| 8,022,119 B2 | 9/2011 | Poppe | |
| 8,147,974 B2 | 4/2012 | Baikerikar | |
| 8,257,780 B2 | 9/2012 | Ohlhausen | |
| 8,263,185 B2 | 9/2012 | Huck | |
| 8,263,725 B2 | 9/2012 | Ichiryu | |
| 8,338,531 B2 | 12/2012 | Lejeune | |
| 8,349,065 B2 | 1/2013 | Ranka | |
| 8,361,217 B2 | 1/2013 | Voit | |
| 8,454,149 B2 | 6/2013 | Lambright | |
| 8,481,668 B2 | 7/2013 | Gauthier | |
| 8,637,116 B2 | 1/2014 | Shiao | |
| 8,642,673 B2 | 2/2014 | Spyrou | |
| 8,658,286 B2 | 2/2014 | Killilea | |
| 2002/0120059 A1 | 8/2002 | Wielstra | |
| 2002/0183460 A1 | 12/2002 | Saeki | |
| 2003/0129397 A1 | 7/2003 | Wilson | |
| 2005/0008613 A1 | 1/2005 | Peterson | |
| 2005/0089695 A1 | 4/2005 | Moffat | |
| 2005/0142329 A1 | 6/2005 | Anderson | |
| 2005/0171318 A1 | 8/2005 | Okuhira | |
| 2005/0271882 A1 | 12/2005 | Walther | |
| 2006/0111536 A1 | 5/2006 | Kohno | |
| 2006/0225612 A1 | 10/2006 | Lejeune | |
| 2006/0225613 A1 | 10/2006 | Lejeune | |
| 2007/0059539 A1 | 3/2007 | Doehler | |
| 2007/0298217 A1 | 12/2007 | Chen | |
| 2007/0298268 A1 | 12/2007 | Haitko | |
| 2008/0021212 A1 | 1/2008 | Whiteford | |
| 2008/0058490 A1 | 3/2008 | Le | |
| 2008/0160289 A1 | 7/2008 | Lin | |
| 2008/0261007 A1 | 10/2008 | Hong | |
| 2008/0287611 A1 | 11/2008 | Ludewig | |
| 2009/0127513 A1 | 5/2009 | Kroupa | |
| 2009/0274914 A1 | 11/2009 | Hoshi | |
| 2009/0281236 A1 | 11/2009 | Matsushita | |
| 2009/0304956 A1 | 12/2009 | Probster | |
| 2010/0035044 A1 | 2/2010 | Feng | |
| 2010/0164308 A1 | 7/2010 | Zapf | |
| 2010/0191001 A1 | 7/2010 | Wassmer | |
| 2010/0203290 A1 | 8/2010 | Whitaker | |
| 2010/0203338 A1 | 8/2010 | Fan | |
| 2010/0283568 A1 | 11/2010 | Zapf | |
| 2011/0000658 A1 | 1/2011 | Tanaka | |
| 2011/0027602 A1 | 2/2011 | Scheerder | |
| 2011/0030791 A1 | 2/2011 | Snowwhite | |
| 2011/0086174 A1 | 4/2011 | Lee | |
| 2011/0124794 A1 | 5/2011 | Friedel | |
| 2011/0136976 A1 | 6/2011 | Nakamura | |
| 2011/0144226 A1 | 6/2011 | Spyrou | |
| 2011/0156318 A1* | 6/2011 | Sugasaki | B41C 1/05 264/400 |
| 2011/0200823 A1 | 8/2011 | Shiao | |
| 2011/0250350 A1 | 10/2011 | Thorlaksen | |
| 2012/0015200 A1 | 1/2012 | Ali | |
| 2012/0034458 A1 | 2/2012 | Zapf | |
| 2012/0059089 A1 | 3/2012 | Greenwood | |
| 2012/0070481 A1 | 3/2012 | Bolkan | |
| 2012/0085408 A1 | 4/2012 | Lamb | |
| 2012/0111404 A1 | 5/2012 | Hwang | |
| 2012/0156382 A1 | 6/2012 | Eichelmann | |
| 2012/0157583 A1 | 6/2012 | Shiao | |
| 2012/0183787 A1 | 7/2012 | Nagelsdiek | |
| 2012/0196953 A1 | 8/2012 | Ziolkowski | |
| 2012/0309246 A1 | 12/2012 | Tseitlin | |
| 2013/0014445 A1 | 1/2013 | Wang | |
| 2013/0059072 A1 | 3/2013 | Wang | |
| 2013/0085210 A1* | 4/2013 | Friedel | C04B 24/42 524/5 |
| 2013/0276668 A1 | 10/2013 | Ranka | |
| 2014/0057116 A1 | 2/2014 | Cassingham | |
| 2014/0170362 A1 | 6/2014 | Ali | |

FOREIGN PATENT DOCUMENTS

| | | |
|---|---|---|
| CN | 102260459 | 11/2011 |
| CN | 102260460 | 11/2011 |
| EP | 0259802 | 3/1988 |
| EP | 0620242 | 10/1994 |
| EP | 0720993 | 7/1996 |
| EP | 1065562 | 1/2001 |
| EP | 1275660 | 1/2003 |
| JP | H07268277 | 10/1995 |
| JP | H09150493 | 6/1997 |
| JP | 2011-032155 | 2/2011 |
| JP | 5232945 | 7/2013 |
| TW | 200927775 A | 7/2009 |
| WO | WO 2000-72850 | 12/2000 |
| WO | WO 2002-10244 | 2/2002 |
| WO | WO 2003-093386 | 11/2003 |
| WO | WO 2005-035637 | 4/2005 |
| WO | WO 2005-089480 | 9/2005 |
| WO | WO 2005-103366 | 11/2005 |
| WO | WO 2007-032923 | 3/2007 |
| WO | WO 2008-063317 | 5/2008 |
| WO | WO 2008-082936 | 7/2008 |
| WO | WO 2009-007232 | 1/2009 |
| WO | WO 2009-019311 | 2/2009 |
| WO | WO 2009-022559 | 2/2009 |
| WO | WO 2009-085926 | 7/2009 |
| WO | WO 2009-104161 | 8/2009 |
| WO | WO 2010-091326 | 8/2010 |
| WO | WO 2011-088950 | 7/2011 |
| WO | WO 2011-092278 | 8/2011 |
| WO | WO 2011-149998 | 12/2011 |
| WO | WO 2011-150001 | 12/2011 |
| WO | WO 2013-024280 | 2/2013 |

OTHER PUBLICATIONS

CAS No. 56706-10-6, Nov. 16, 1984. (Year: 1984).*
Concise Science Dictionary, Oxford University Press, 1987, pp. 126, 127, and 726. (Year: 1987).*

(56) References Cited

OTHER PUBLICATIONS

Battelle Columbus Laboratories, NTIS, Polymer Research In Rapid Runway Repair Materials, Nov. 1979, 99 pages.
Brown, "Contribution of Microorganisms to Stripping of Asphalt Pavements", Final Report to Mississippi State Highway Department, Dec. 1988, 46 pages.
Chiang, "The effect of organo-functional silanes on the adhesion of epoxide resins to ITO glass", Journal of Adhesion Science and Technology, 2005, vol. 19, No. 1, pp. 1-18.
Choi, "Effect of Silane Coupling Agent on the Durability of Epoxy Adhesion for Structural Strengthening Applications", Polymer Engineering and Science, 2013, vol. 53, No. 2, pp. 283-294.
Doidjo, "Influence of silane-based treatment on adherence and wet durability of fusion bonded epoxy/steel joints", Progress in Organic Coatings, 2013, Vo.76, No. 12, pp. 1765-1772.
Fu, Effects of particle size, particle/matrix interface adhesion and particle loading on mechanical properties of particulate-polymer composites, Composites: Part B, 2008, vol. 39, pp. 933-961.
Geiculescu, "X-ray scattering studies of polymeric zirconium species in aqueous xerogels", Journal of Non-Crystalline Solids, 2002, vol. 306, No. 1, pp. 30-41.
Hatefi, "The effect of silane layer drying temperature on epoxy coating adhesion on silane-pretreated aluminum substrate", Journal of Coatings Technology Research, 2013, vol. 10, No. 5, pp. 743-747.
International Search Report for PCT International Application No. PCT/US2015/025268, dated Jun. 19, 2015, 4 pages.
International Search Report for PCT International Application No. PCT/US2015/025262, dated Jun. 23, 2015, 5 pages.
Kogler, "Waterproofing Membranes: A Vital Component of the Bridge of the Future", Journal of Protective Coatings and Linings, 2005, vol. 22, No. 8, pp. 59-64.
Kooi, "Improving silane coupling to rubber" Rubber World, vol. 232, No. 1, 2005, pp. 21-23.
Leinoa, "A very simple method for the preparation of symmetrical disulfides", Tetrahedron letters, 2004, vol. 45, No. 46, p. 8489-8491.
Sivy, "Discoloration of Elastomeric Joint Sealants", Adhesive and Sealants Industry, Apr. 2013, pp. 1-24.
Thiedman, "Silane Coupling Agents as Adhesion Promoters for Aerospace Structural Film Adhesives", The Journal of Adhesion, 1987, vol. 22, No. 3, pp. 197-210.
Transportation research circular, Oct. 2009, E-C140, 78 pages.
Wang, "Hygrothermal Aging of Silane-Laced Epoxy Coatings", Journal of Adhesion Science and Technology, 2010, vol. 24, No. 4, pp. 699-708.
Wang, "Preparation and Properties of Asphalts Modified with SBS/Organobentonite Blends", Polymers and Polymer Composites, 2006, vol. 14, No. 4, pp. 403-411.
Zirkar, "Zirconia Cement", [on line], [retrieved from the internet on Dec. 13, 2016], URL <http://zircarzirconia.com/products/type-zr-cem-zirconia-cement/>, 1 pages.

* cited by examiner

ADHESION PROMOTING AND/OR DUST SUPPRESSION COATING

CROSS REFERENCE TO RELATED APPLICATIONS

This application is a national stage filing under 35 U.S.C. 371 of PCT/US2015/025262, filed Apr. 10, 2015, which claims the benefit of U.S. Provisional Application No. 61/977,970, filed Apr. 10, 2014, the disclosure of which is incorporated by reference in its/their entirety herein.

FIELD

This disclosure generally relates to, among other things, adhesion promoting or dust suppression coating compositions and articles coated with such compositions; e.g., granules, such as roofing granules, coated with such compositions.

BACKGROUND

Asphalt roofing systems and products generally comprise a fiberglass or organic matting, which is filled or coated with various asphalt materials. Generally, the matting is filled with a saturant asphalt that is oil-rich and relatively non-viscous. The saturant asphalt serves as a preservative, a waterproofing agent and an adhesive agent. The saturated substrate may be sealed by application of a harder, more viscous coating asphalt to one or both sides of the substrate. Coating asphalts typically contain finely divided minerals therein as stabilizers or fillers. Such compounds as igneous rock mineral fines, silica, slate dust, talc, micaceous materials, limestone and dolomite have been utilized as fillers to render the coating asphalt more shatter-proof and shock-proof in cold weather.

The exterior, outer, or exposed surface of asphalt roofing systems and products is generally provided with a covering of granular material or roofing granules embedded in the coating asphalt. The granular material generally protects the underlying asphalt coating from damage due to exposure to light, in particular ultraviolet (UV) light. That is, the granules reflect light and protect the asphalt from deterioration by photodegradation. In addition, such granular material improves fire resistance and weathering characteristics. Further, colors or mixtures of colors of granular material may be selected for aesthetics.

In general, the mineral materials, particles or granules are embedded into the coating asphalt under pressure and are retained therein by adherence to the asphalt. With respect to each granule, the asphalt may be viewed as a "hot sticky mud" into which the granules are pressed. When the asphalt cools, pockets having the granules retained therein are formed.

Good adherence of the roofing granules to the roofing product is beneficial. Loss of granules reduces the life of the roof, since it is associated with acceleration of photodegradation of the asphalt. In addition, the aesthetics of the roofing system may be compromised if granules are lost. Further, reduction of granule loss during installation improves safety conditions on the roof.

The granule may be coated with a variety of materials, to render unique and desirable properties. By way of example, the granules may be coated with an oil or a synthetic polymer for purposes of dust suppression or agglomeration. By way of further example, granules are generally treated with an adhesion promoter. Typically, the adhesion promoter has been polyalkylsiloxane, which makes the surface of the coated granule hydrophobic for better wetting with asphalt. This treatment reduces the ingress of water at the granule-asphalt interface, improving the adhesion. When polyalkylsiloxane surface treatments are used, the adhesion at the granule-asphalt interface is dominated by van der Waals interactions.

SUMMARY

This disclosure describes, among other things, adhesion promoter coating compositions for bonding a first substrate and a second substrate together. The adhesion promoter coatings are generally between the two substrates. The coatings can be especially useful in the manufacture of roofing materials, such as roofing shingles. For example, the adhesion promoter coating compositions may be used to promote bonding between roofing granules and asphalt of roofing shingles. In various embodiments, the adhesion promoter compositions provide for covalent or ionic interactions between the first substrate (e.g., roofing granule) and the second substrate (e.g., asphalt), which can provide stronger interaction, and thus better adhesion, than van der Waals interactions.

In some embodiments, the adhesion promoter coating compositions comprise an electrophile moiety. The electrophile may covalently bond with nucleophile moieties naturally present in asphalt or added to the asphalt. Preferably, a molecule of the coating that comprises the electrophile also comprises an alkoxysilyl moiety for covalently binding to a mineral granule, such as a roofing granule. Accordingly, the molecule may covalently bind to both the granule and the asphalt, which should strengthen adhesion of the granule to the asphalt relative to coatings that rely on van der Waals interactions between the coated granule and the asphalt in roofing shingles.

This disclosure also describes, among other things, dust suppression coating compositions. The dust suppression coating compositions can be especially useful in suppressing dust associated with granules, such as roofing granules. The dust suppression coating composition can, in some embodiments, also serve as an adhesion promoter coating composition. In some embodiments, the dust suppression coating compositions comprise a quaternary ammonium moiety. Without intending to be bound by theory, the quaternary ammonium compound is believed to suppress dust through ionic interaction of the positively charged quaternary ammonium moiety and negatively charged dust particles. The quaternary ammonium moiety may also form an ionic bond with certain species, such as acid species, in asphalt or added to asphalt, particularly polyphosphoric acid (PPA) which can be added to asphalt for purposes known to those skilled in the art. Accordingly, a dust suppression coating composition comprising a quaternary ammonium compound as described herein may also serve as an adhesion promoter. In some embodiments, the dust suppression polymer is a polyacrylate, a polyurethane, or the like. In particular embodiments, the coating polymer comprises an acrylic emulsion polymer having one or more quaternary ammonium moieties.

In some embodiments described herein, a coating composition comprises an oligomeric alkylalkoxysiloxane; and a compound comprising an electrophile moiety and an alkoxysilyl moiety. The coating composition may be an adhesion promoter coating composition.

In some embodiments, described herein a roofing granule comprises a base roofing granule; and a coating on the base granule. The coating includes a silyl moiety bound to the base granule and an electrophile moiety.

In some embodiments described herein, a coating composition includes an acrylic polymer comprising a quaternary ammonium moiety. The acrylic polymer comprising the quaternary ammonium moiety may further include one or more of a carboxylic acid moiety, an alkoxysilyl moiety, and an electrophile moiety. The composition may further include one or more of an oligomeric alkylalkoxysiloxane and a compound comprising an electrophile moiety and an alkoxysilyl moiety. The coating composition may be a dust suppression coating composition or an adhesion promoter composition.

In some embodiments described herein, a roofing granule includes a base roofing granule; and a coating on the base granule, the coating comprising an acrylate polymer comprising a quaternary ammonium moiety. The acrylic polymer comprising the quaternary ammonium moiety may further include one or more of a carboxylic acid moiety, a silyl moiety, and an electrophile moiety. The silyl moiety may be bound to the base granule. The coating may further include one or more of an oligomeric alkylalkoxysiloxane and a compound comprising an electrophile moiety and an alkoxysilyl moiety. At least some of the oligomeric alkylalkoxysiloxane, if present, may be bound to the base granule and thus may be present as an alkylsilyl moiety bound to the base. At least some of the compound comprising the alkoxysilyl moiety, if present, may be bound to the base granule and thus at least some of the alkoxysilyl moiety may be present as a silyl moiety bound to the base.

In some embodiments, a coating composition is provided including an oligomeric alkylalkoxysiloxane and a compound comprising an electrophile moiety and an alkoxysilyl moiety, and the electrophile moiety includes a sulfide and/or polysulfide functional group.

One or more embodiments of the compositions, articles, systems, or methods described herein provide one or more advantages over prior compositions, articles, systems, or methods. Such advantages will be readily understood from the following detailed description.

Figure 1:
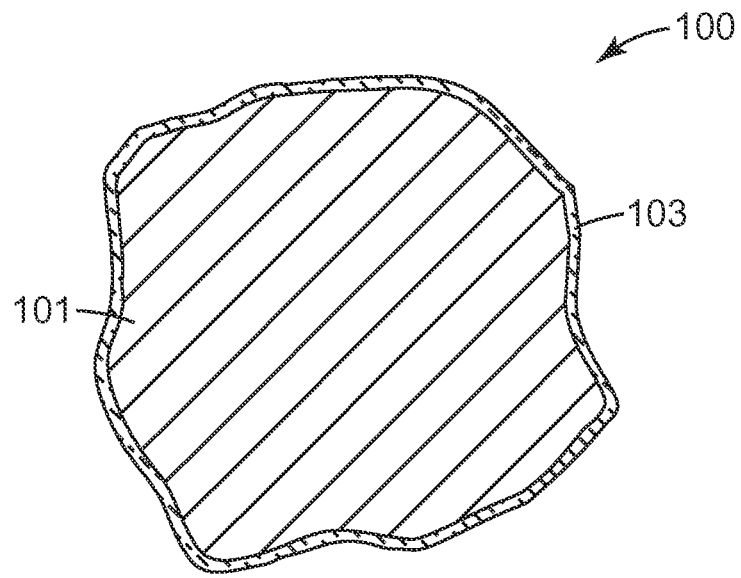
FIG. 1 is a schematic drawing of a coated granule.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

This disclosure describes, among other things, adhesion promoter coating compositions and dust suppression coating compositions. The coating compositions may be applied to, among other things, roofing granules. In some embodiments, the adhesion promoter coating compositions include a compound that has a silyl moiety capable of covalently bonding with a roofing granule and an electrophile moiety capable of covalently binding with a nucleophile in asphalt. In some embodiments, the dust suppression coating compositions include a polymer comprising a quaternary ammonium compound.

In some embodiments, an adhesion promoter coating composition includes an adhesion compound comprising a silyl moiety capable of forming a siloxy bond with a mineral granule (e.g., via condensation reaction) and an electrophile moiety capable of bonding with a nucleophile moiety in asphalt (e.g., via SN1 or SN2 nucleophilic substitution). When used in asphalt roofing shingles to promote adhesion of roofing granules to asphalt, the adhesion compound can covalently bond to both the granule and the asphalt. With typical adhesion promoter coatings, van der Waals interactions are primarily responsible for adhering the coated granule to the asphalt.

An adhesion compound can include any suitable silyl moiety capable of forming a covalent bond (e.g., a siloxy bond) with a base roofing granule (e.g., mineral roofing granule). Preferably, the silyl moiety is an alkoxysilyl moiety, where an alcohol serves as a leaving group upon condensation. In some embodiments, the alkoxylsilyl moiety is a di- or tri-alkoxysilyl moiety. One or more of the alkoxy groups may be a $C_1$-$C_4$ alkoxy group.

By way of example, an adhesion compound may have the following generic structure:

$$[C_nH_{(2n+1)}O]_mSi\text{-}[L\text{-}E]_p \qquad (I),$$

where L is an optional linker, E is an electrophile moiety, n is an integer of zero to three; m is an integer of one to three; and p is 4−m.

Any suitable linker may be employed. In some embodiments, a linker can comprise a $C_1$-$C_{10}$ alkyl or ether backbone, such as a $C_2$-$C_7$ backbone or a $C_3$-$C_5$ backbone. In some embodiments, the linker may be hydrophobic hydrocarbon chain to facilitate wetting with asphalt. In some embodiments, a hydrophobic hydrocarbon chain may be a substituent (not shown in Formula I) to facilitate wetting with asphalt. In some embodiments, the linker may be a cyclic aliphatic or aromatic linker.

In some embodiments, two or more electrophile moieties may be present on the adhesion compound.

In some embodiments, the adhesion compound may be a polymer having one or more electrophile moieties and one or more silyl moieties, such as alkoxysilyl moieties. Any suitable polymer may be employed.

In some embodiments, the polymer comprises a polyolefin. For the purpose of the present disclosure, a polyolefin is a polymer with an olefin backbone. Polymers include oligomers of low molecular weight and include a wide range of number average molecular weights, including, for example, as low as 300. Olefins include ethylene, propylene, butene, and the like. These olefins can be aliphatic, aromatic, cyclic or other olefins. The polyolefin may be a homopolymer or a copolymer of olefins. In addition to one or more olefins, the polyolefin can optionally comprise one or more other monomer units, such as styrenes, acrylics, urethanes, and others known in the art. Such copolymers include random and block copolymers.

A polymer, such as a polyolefin, can be chemically modified to include a reactive group, such as an electrophile (e.g., epoxide, halide, etc.), in any suitable manner. The polymer may be modified to include a silyl moiety, such as an alkoxysilyl moiety in any suitable manner For example, electrophiles may be readily incorporated into polymers by reacting with unsaturated double bonds with modifying chemicals such as halogens and peroxides for halogenation and epoxidization, respectively. By way of example, alkoxysilanes may be attached to the polymer via SN2 reaction, thiol-ene reaction, or the like. For example, mercaptopropylalkoxysilane can be reacted with an unsaturated carbon of a polymer (e.g., polybutadiene) via thiol-ene reaction for silane grafting. As another example, isocyanatopropylalkoxysilane may be grafted to a polymer (e.g., polybutadiene) by reacting with a hydroxyl end group of the polymer. Silyl moieties may also be attached to epoxidized polymers via some fraction of the total epoxide moieties (leaving some for interaction with nucleophiles in, e.g., asphalt).

In some embodiments, an adhesive compound is an epoxidized polybutadiene polymer modified to include alkoxysilane, or the like.

In various embodiments, an adhesive compound is an oil, such as soybean oil, modified to include an electrophile. The oil may be modified to include the electrophile in any suitable manner, such as described above with regard to modification of polymers (reacting halogens or peroxides with an unsaturated carbon). In some embodiments, the oil is an epoxidized oil. In some embodiments, the oil is epoxidized soybean oil. The oil may be further modified to include a silyl moiety. By way of example, an epoxidized oil may be modified with a silyl group through reaction at some fraction of the epoxide moieties resulting from the epoxidization.

An adhesion compound may contain any suitable electrophile moiety. Examples of electrophiles include epoxide moieties, halogen-containing moieties, aziridine moieties, sulfide and polysulfide moieties, and the like. The nucleophile moiety to which the adhesion compound bonds in asphalt can be a nucleophile moiety naturally present in asphalt or may be added to asphalt. Examples of nucleophile moieties naturally found in asphalt include hydroxy, amine, sulfhydryl, etc.

In some embodiments, an adhesion compound comprises an epoxide moiety, which can undergo ring-opening reaction with various nucleophiles. The utilization of epoxide moiety for the application has several advantages including a) no production of byproducts during the bond formation b) relatively hydrophobicity c) commercial availability of useful monomers and adhesion compounds.

Examples of adhesion compounds which contain an epoxide moiety include:

1. 3-Glycidoxypropyltriethoxysilane CAS #2602-34-8

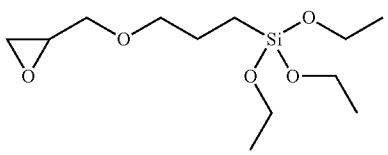 [SMILES: CCO[Si](CCCOCC1CO1)(OCC)OCC]

2. β-(3,4-epoxycyclohexyl)ethyltriethoxysilane CAS #10217-34-2

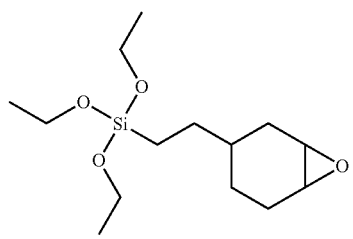 [SMILES: CCO[Si](CCC1CCC2OC2C1)(OCC)OCC]

3. Epoxidized polybutadiene modified with different levels of alkoxysilane Reaction products of epoxydized polybutadiene (Cray Valley, bd 605E) and 3-Isocyanatopropyltriethoxysilane (CAS #24801-88-5)
4. Epoxidized polybutadiene modified with mercaptoalkoxysilane Reaction products of epoxydized polybutadiene (Cray Valley, bd 605E) and 3-Mercaptopropyltriethoxysilane (CAS #14814-09-6)

When the compounds above were used in adhesion promoter compositions to coat mineral granules in asphalt adhesion tests, they showed improved adhesion with both normal and PPA-modified asphalt.

In some embodiments, an electrophile moiety may be a sulfide or polysulfide functional group. Sulfide and polysulfide functional groups present in a coating, for example on a roofing granule, can form chemical bonds with nucleophiles in asphalt. The sulfide and disulfide functionality present in a coating may, in addition or alternatively, result in metal-sulfide complexes by interacting with heavy metal species of asphalt.

In various exemplary embodiments, adhesion compounds which contain a sulfide or polysulfide moiety include:

Bis(triethoxysilylpropyl) disulfide CAS #56706-10-6

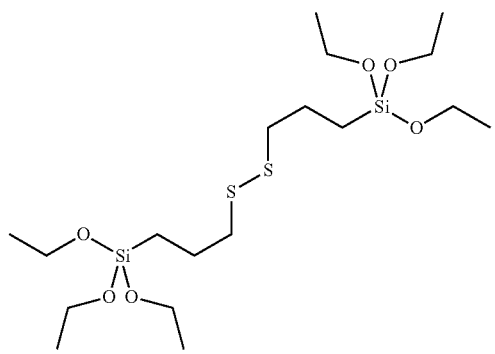 [SMILES: CCO[Si](CCCSSCCC[Si](OCC)(OCC)OCC)(OCC)OCC]

Bis [3-(triethoxysilyl)propyl]tetrasulfide CAS #40372-72-3

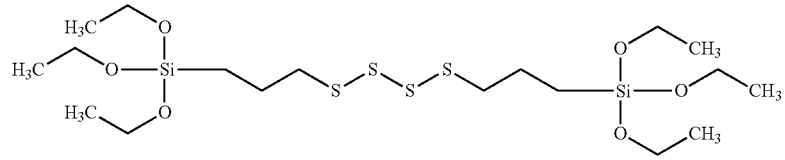 [SMILES: CCO[Si](CCCSSSSCCC[Si](OCC)(OCC)OCC)(OCC)OCC]

Reaction products of trimethylolpropane tris(3-mercaptopropionate) (CAS #33007-83-9) modified with 3eq. 3-mercaptopropyltriethoxysilane (CAS #14814-09-6), other suitable materials, and combinations thereof, may also be used. Such materials coated on mineral roofing granules showed improved adhesion with both normal and PPA-modified asphalt.

In some embodiments, an adhesion promoter composition includes (in addition to an adhesion compound as described above) an oligomeric alkylalkoxysilane. The alkylalkoxysilane can contain a hydrocarbon tail for better wetting with the hydrophobic asphalt. A siloxane bond can form between a granule surface and the alkylalkoxysilane via condensation reaction leaving the hydrophobic hydrocarbon tail on the granule surface. The transformation of the hydrophilic surface into a hydrophobic oily surface improves wetting of the granule surface by the asphalt. The coating composition may contain any suitable ratio of adhesion compound to alkylalkoxysilane. For example, the composition may have a ratio of adhesion compound to alkylalkoxysilane of about 4:1, 3:1, 2:1, 1:1, 1:2, 1:3, 1:4 or the like.

Any suitable alkylalkoxysilane may be used in the coating composition. One example of a suitable alkylalkoxysilane is isooctyltrimethoxysilane $[(MeO)_3SiCH_2C(CH_3)_2CH_2C(CH_3)_2]$ or an oligomer thereof or containing a portion thereof, such as SILRES® BS 68 available from Wacker Chemical Corporation, Adrian, Mich. USA.

A coating composition optionally may include one or more additional compounds that can reduce the surface free energy of a granule surface. The additional compounds may include silane functionality, or the like, to provide siloxane linkage to the granule. In some embodiments, a coating composition includes a coating vehicle such as oil.

In some embodiments, an adhesion promoter is the reaction product of a low molecular weight epoxy resin or epoxy compound with one or more reactants. The reaction product can also be referred to as an adduct or amine adduct. Suitable reactants include but are not limited to organic compounds containing amine, carboxylic acid, phenolic, or thiol groups. Suitable epoxy resins contain on average one or more epoxy groups and may contain 2 or more epoxy groups. Examples of epoxy resins include aliphatic, cycloaliphatic, and aromatic resins. Aliphatic resins include epoxidized vegetable oils, epoxidized ethers, and epoxidized ester compounds. Cycloaliphatic resins include: 3,4-epoxy cyclohexyl methyl-3',4' epoxycyclohexane carboxylate, β-(3,4-epoxycyclohexyl)ethyltriethoxysilane, and vinyl cyclohexene diepoxide. Examples of aromatic resins include Diglycidyl ethers of bisphenol A and bisphenol F, glycidyl ethers of phenolic novolacs and bisphenol A novolacs, and glycidyl and diglycidyl derivatives of aromatic amino compounds such as aminophenol and aniline.

Suitable amine reactants may or may not contain silane groups and include monofunctional amines, aliphatic diamines, aliphatic tetramines, aminoalcoholic compounds, amino silanes, diamino silanes, polyamides, amino functionalized resins, cycloaliphatic amines, and aromatic amines. Amine reactants are well known in the field of epoxy resins and may be used in combination and at various stoichiometric ratios when reacted with epoxy groups. This ring opening reaction is well-known and produces a single carbon to carbon bond and a hydroxyl group. Aminosilanes are particularly well suited as adhesion promoters because the reaction of an aminosilane and epoxide moiety create a new molecule with both hydroxyl and silane groups and optionally, epoxy groups. The hydroxyl group adds polarity to the molecule and the silane group (e.g. alkoxysilanes) is capable of various chemical reactions known to produce covalent bonds and create adhesion.

The molecular architecture of the reaction product can be designed and readily controlled by one skilled in the art. The new molecules can range from relatively simple low molecular weight compounds to oligomeric compounds that are branched and have multiple functional groups including one or more reactive silane groups. The latter compounds with two or more reactive silane groups are useful for adhesion promotion because they can bond at multiple sites on a glass or mineral surface and self-crosslink to form a relatively insoluble polymeric coating. Such reaction products are very useful for promoting adhesion and also permanently modifying the surface of the roofing granule. By varying the amine reactants and epoxy reactants, a wide variety of different adhesion promoters can be created. For example, one could create a linear molecule by reacting a diepoxide with monofunctional amines such as ethanolamine and 3-aminopropyl triethoxl silane. The molecular weight of the reaction product would be dependent on the purity of the reactants and on the stoichometric ratio of the epoxide group to the number of reactive amine hydrogens. By this one example, one could readily prepare numerous different adhesion promoters with a wide variety in molecular weight and various degrees of silane functionality depending on the amount of aminosilane used. Furthermore the endgroups of the molecule can also be easily controlled. If a stoichiometric excess of epoxy was used, the endgroups would be epoxy moieties. If excess amine was used, the end groups would be either silane groups or hydroxyl groups (capped by the aminoethanol).

All these reaction products are useful because they are easily handled, relatively low in cost, and provide exceptional wet adhesion. Curing of the adhesion promoter via reaction of the silane groups generally creates materials and articles of low toxicity. Furthermore, if sufficient crosslinking is obtained, the final cured resin (after the silane groups have reacted with the mineral surface or each other) can have solvent, water, and resistance to extraction. It is well known that epoxy resins and cured epoxy resins are often used in harsh environments as high performance coatings for flooring, chemical tanks, oil pipelines, advanced composites, marine vessels, and corrosion protection.

The reaction of adhesion promoters described herein with mineral surfaces can take place under a variety of conditions. There are various methods of treating a mineral surface (e.g. roofing granule). These include diluting the adhesion promoter with a hydrocarbon carrier oil and spraying and/or tumbling. Alternatively, the adhesion promoter may be chemically formed using an inline mixing process by metering the amine and epoxy resin into a carrier fluid. By this route, the adhesion promoter may be chemically formed in the carrier stream or even on the mineral surface.

In some embodiments, an adhesion promoter as described herein can be combined with a known adhesion promoter such as octyl trimethoxysilane. By combining the two, the polarity of the mineral surface can be tuned and yet still surprisingly have good adhesion after boiling in water (simulation of hot-wet performance). Furthermore, the known adhesion promoter such as octyl trimethoxysilane serves essentially as a reactive diluent and a way to control viscosity if higher molecular weight adhesion promoters as described herein are used.

Dust suppressing coating compositions described herein may be applied to dusty surfaces, for example mining surfaces, soil or construction surfaces. For the purpose of the present disclosure, a dusty surface has particles with a cross sectional length less than 30 micrometers on the surface. Generally, the particles are loose from the surface. Examples of surfaces include haul roads, mining material in an open railcar, materials on a conveyor belt, coal and mining materials such as iron ore stock piles in power plants and steel mills, unpaved rural roads and roofing granule surfaces. Specific examples of dusty surfaces include aggregates, e.g. crushed rock, coal, iron ore, gravel, and sand.

Dust suppressing coating compositions described herein are preferably useful in suppressing dust associated with roofing granules. Preferably, the dust suppressing coating suppresses dust associated with storage, transfer or transport of roofing granules, such as transfer in and out of rail cars, transfer to storage containers or facilities, and during transport.

In some embodiments, a dust suppression coating composition comprises a quaternary ammonium moiety. Without intending to be bound by theory, the quaternary ammonium moiety is believed to suppress dust through ionic interaction of the positively charged quaternary ammonium moiety and negatively charged dust particles. The quaternary ammonium moiety may also form an ionic bond with certain naturally occurring or added species, such as acid species, in asphalt, particularly polyphosphoric acid (PPA) added asphalt. Of course, other anionic species are present in asphalt, including non-PPA asphalt, to which an ionic bond may form. Accordingly, a dust suppression coating composition comprising a quaternary ammonium compound as described herein may also serve as an adhesion promoter.

The quaternary ammonium moiety may be incorporated into a polymer. In some embodiments, the dust suppression coating polymer comprises water-based polymers, such as a polyacrylate (e.g. an acrylic emulsion polymer) or a thermoplastic polymer. These polymers may have a glass transition temperature (Tg) of from about −60° C. to about 60° C., or higher. In some embodiments, these polymers possess a low Tg, such as a Tg less than −20° C. For example, the Tg can be less −30° C. In some embodiments, the Tg is less than −45° C. In particular embodiments, the coating polymer comprises an acrylic emulsion polymer having a quaternary ammonium moiety. In embodiments, the coating polymer is a polymer as described in U.S. Patent Publication 2014/0170362.

Polyacrylates (which for the purposes of the present disclosure include polymethacrylates) can be prepared by emulsion polymerization of one or more acrylate monomers (which for the purposes of the present disclosure include methacrylate monomers) in the presence of initiators and optional surfactants. The monomers may include N-vinyl pyrrolidone, isobutyl (meth)acrylate, n,-butyl (meth)acrylate, isopropyl (meth)acrylate, n-propyl (meth)acrylate, methyl (meth)acrylate, ethyl (meth)acrylate, vinyl acetate, hydroxyethyl (meth)acrylate, hydroxypropyl (meth)acrylate, octadecyl (meth)acrylate, stearyl (meth)acrylate, dimethyl acrylamide, N-(hydroxymethyl)-acrylamide, dimethylaminoethyl (meth)acrylate, methoxy polyethylene glycol (meth)acrylate, polydimethylsiloxane (meth)acrylate), KF 2001 (mercapto modified dimethylsiloxane), perfluorobutyl sulfonamido n-methyl ethyl acrylate, and hexafluoropropylene oxide oligomer amidol (meth)acrylate isobornyl (meth) acrylate, isooctyl(meth)acrylate, 2-ethyl hexyl (meth)acrylate, 2-hydroxy ethyl (meth)acrylate, and the like. Polar monomers can also be added at 0-30% to improve the strength of these polymers. These polar monomers include acrylic acid, methacrylic acid, itaconic acid, N-vinyl pyrrolidone, N-vinyl caprolactam, substituted (meth)acrylamides, such as N,N-dimethyl acrylamides, N,N-dimethylaminoethylacrylates, and N-octylacrylamide, dimethylaminoethyl methacrylate, acrylonitrile, 2-carboxyethyl acrylate, maleic anhydride, and the like, and mixtures thereof.

A monomer having quaternary ammonium functionality may be included in the polymerization mixture. Any suitable quaternary ammonium-containing monomer may be used. In some embodiments, the monomer is an acrylate ester including alkylammonium functionality. In some embodiments, all three alkyl groups of a monomer having alkylammonium functionality are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the monomer is a 2-(trialkyl ammonium)ethyl acrylate, which may be formed from the reaction of 2-(dimethylamino)ethyl acrylate or 2-(dimethylamino)ethyl methacrylate with an alkyl halide. Another example of a suitable quaternary ammonium-containing monomer is 2-trimethylammoniumethyl methacrylate chloride.

In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality The reaction mixture for forming the polymer may include any suitable concentration of monomer having quaternary ammonium functionality (or capable of being converted to having ammonium functionality). Without intending to be bound by theory, it is believed that higher concentrations of quaternary ammonium functionality will result in improved dust suppression. However, when used in asphalt-based roofing materials or other products where the dust suppression coating may interact with a hydrophobic material, the desire for increased dust suppression (and thus higher ammonium concentration and higher positive charge) should be balanced against the desire to effectively interact with the hydrophobic material. To prevent water ingress at the granule-asphalt interface, it is desirable that the majority of the granule surface be hydrophobic. In various embodiments, the polymer includes from about 0.1% by weight to about 50% by weight of the quaternary ammonium functionality. If the polymer is an emulsion polymer, the weight percentage of quaternary ammonium monomer included in the polymer will typically be less than about 10%, such as 8% or less. If the polymer is a solution polymer the weight percent of the quaternary ammonium monomer included in the polymer can be, but need not be, higher, such as up to about 65% or more.

In embodiments, a polymer formed from a reaction mixture including the quaternary ammonium-containing monomer comprises quaternary ammonium-containing monomer at about 2 wt % to 45 wt % based on the total weight of the polymer, or at about 2 wt % to 35 wt % of the polymer, or at about 4 wt % to 25 wt % of the polymer, or at about 6 wt % to 15 wt % of the polymer, or at about 7 wt % to 10 wt % of the polymer, or in various intermediate levels such as 3 wt %, 5 wt %, 6 wt %, 8 wt %, and all other such individual values represented by 1 wt % increments between 2 and 45 wt %, and in any range spanning these individual values in 1 wt % increments, such as 2 wt % to 4 wt %, 7 wt % to 38 wt %, 20 wt % to 25 wt %, and the like.

In some embodiments, the polymer having quaternary ammonium functionality further includes hydrophobic hydrocarbon functionality, which may enhance wetting with asphalt when a coated surface is contacted with asphalt-containing articles. Hydrophobic hydrocarbon functionality may be provided by a pendant hydrocarbon chain, such as a $C_3$ or greater chain; e.g., a $C_5$-$C_{12}$ chain or the like. Hydrophobic hydrocarbon functionality may be incorporated into a polymer by including a monomer having hydrophobic hydrocarbon functionality into a mixture for polymerization. In various embodiments, the monomer having hydrophobic hydrocarbon functionality is acrylate or methacrylate ester of an alcohol having between 8 and 12 carbons. The alcohol may be linear, branched or cyclic. Examples of alcohols useful in the acrylate or methacrylate esters include octyl, isooctyl, nonyl, isononyl, decyl, undecyl, and dodecyl alcohol. In some embodiments, the alcohol is isooctyl alcohol.

The polymer may include any suitable concentration of hydrophobic hydrocarbon functionality. For example, the polymer may include about 50% to about 99.9% hydrophobic functionality. In some embodiments, a polymer formed from a reaction mixture that includes the monomer having hydrophobic hydrocarbon functionality comprises about 50 wt % to 95 wt % of the monomer comprising the hydrophobic hydrocarbon functionality relative to the total weight of the polymer, or at about 60 wt % to 90 wt % of the total weight of the polymer, or at about 75 wt % to 85 wt % of the total weight of the polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt %, and the like.

In some embodiments, the polymer may include one or more of silyl functionalities (capable of bonding with a mineral granule—e.g, as discussed above under the heading "Adhesion Promoter Coating Composition", which discussion is incorporated into this section) and electrophile functionality (capable of bonding with a nucleophile in asphalt granule—e.g., as discussed above under the heading "Adhesion Promoter Coating Composition," which discussion is incorporated into this section). Silyl functionality or electrophile functionality may be added to the polymer by incorporating a monomer having silyl or electrophile functionality into the mixture for polymerization. Examples of acrylate monomers having silyl functionality include (trimethoxysilyl)propyl methacrylate and (triethoxysilyl) propyl methacrylate. One example of an acrylate monomer having electrophile functionality is glycidyl methacrylate.

The polymer may include any suitable concentration of silyl functionality. For example, the polymer may include about 0% to about 10% silyl functionality. In some embodiments, a polymer formed from a reaction mixture that includes the monomer having silyl functionality comprises about 0 wt % to 5 wt % of the monomer comprising the silyl functionality relative to the total weight of the polymer.

The polymer may contain any suitable concentration of electrophile functionality. For example, the polymer may include about 0% to about 10% electrophile functionality. In some embodiments, a polymer formed from a reaction mixture that includes the monomer having electrophile functionality comprises about 0 wt % to 5 wt % of the monomer comprising the electrophile functionality relative to the total weight of the polymer.

In some embodiments, the polymer reaction mixture includes an anionic monomer. For example, the reaction mixture may include one or more of acrylic acid, methacrylic acid, a salt thereof, or a blend thereof. In some embodiments the anionic monomer is acrylic or methacrylic acid, and the acid is converted either before or after polymerization to a corresponding carboxylate salt by neutralization. In some embodiments, the polymer reaction mixture comprises about 0 wt % to 5 wt % of the anionic monomer based on the total weight of the polymer.

The polymerization of the polymers having quaternary ammonium functionality are carried out using conventional thermal or radiation polymerization techniques familiar to those of skill. For example, in some embodiments, the monomers are admixed, and irradiated by actinic or ionizing radiation. In some embodiments, air is partially excluded or limited in the reaction area during the irradiation. In some embodiments, an emulsion of monomer is formed and polymerization is carried out using UV or thermal initiation of the polymerization reaction. The emulsion is a water-in-oil or oil-in-water emulsion. In some embodiments, a solution of the monomers is formed in a solvent that is water, an aqueous mixture, or in a solvent other than water, and polymerization is carried out using UV or thermal initiation similarly to the emulsion reaction.

In some embodiments where UV radiation is employed, a photoinitiator is employed to initiate the polymerization reaction via photolysis of the photoinitiator. In some such embodiments, a photoinitiator is selected based on the wavelength of UV radiation to be employed. Where a photoinitiator is employed, it is included in the polymerization mixture at about 0.01 wt % to 5 wt % based on the total weight of the monomers, for example about 0.1 wt % to 2 wt % based on the total weight of the monomers, or about 0.2 wt % to 1 wt % based on the total weight of the monomers. Non-limiting examples of suitable photoinitiators include any of the metal iodides, alkyl metal compounds, or azo compounds familiar to those having skill in the art of UV initiated polymerization; and those sold under the trade name IRGACURE® by Ciba Specialty Chemicals Corp. of Tarrytown, N.Y.; those sold under the trade name CHEMCURE® by Sun Chemical Company of Tokyo, Japan; and those sold under the trade name LUCIRIN® by BASF Corporation of Charlotte, N.C. In the case of emulsion polymerization, water-soluble initiators are preferred.

In some embodiments where thermal decomposition is employed to initiate polymerization, emulsion polymerization of the monomers employed to make the polymers having quaternary ammonium functionality is carried out by blending the monomers, surfactant, and a thermal initiator in water, followed by heating the emulsion to a temperature wherein decomposition of the initiator occurs at a rate suitable to sustain a suitable rate of polymerization. Non-limiting examples of suitable thermal initiators include any of the organic peroxides or azo compounds conventionally employed by those skilled in the art of thermal initiation of polymerization, such a dicumyl peroxide, benzoyl peroxide, or azobisbutyrylnitrile (AIBN), and thermal initiators sold under the trade name VAZO® by duPont deNemours and Company of Wilmington, Del. In the case of emulsion polymerization, water-soluble initiators are preferred.

In other embodiments, an emulsion of monomer is formed and polymerization is carried out using UV or thermal initiation of the polymerization reaction. The emulsion is a water-in-oil or an oil-in-water emulsion. In some such embodiments, the emulsion is an oil-in-water emulsion, wherein the one or more monomers are stabilized in a bulk water phase by employing one or more surfactants. In various embodiments, the surfactant is cationic, anionic, zwitterionic, or nonionic in nature and is the structure thereof not otherwise particularly limited. In some embodiments, the surfactant is also a monomer and becomes incorporated within the polymer. In other embodiments, the surfactant is present in the polymerization reaction vessel but is not incorporated into the polymer as a result of the polymerization reaction.

Non-limiting examples of nonionic surfactants useful in forming oil-in-water emulsions of the monomers employed to form the polymers having ammonium functionality include block copolymers of ethylene oxide and propylene oxide, such as those sold under the trade names PLURONIC®, KOLLIPHOR®, or TETRONIC®, by the BASF Corporation of Charlotte, N.C.; ethoxylates formed by the reaction of ethylene oxide with a fatty alcohol, nonylphenol, dodecyl alcohol, and the like, including those sold under the trade name TRITON®, by the Dow Chemical Company of Midland, Mich.; oleyl alcohol; sorbitan esters; alkylpolyglycosides such as decyl glucoside; sorbitan tristearate; and combinations of one or more thereof.

Non-limiting examples of cationic surfactants useful in forming oil-in-water emulsions of the monomers employed to form the polymers having quaternary ammonium functionality include benzalkonium chloride, cetrimonium bromide, demethyldioctadecylammonium chloride, lauryl methyl gluceth-10 hydroxypropyl diammonium chloride, tetramethylammonium hydroxide, monoalkyltrimethylammonium chlorides, monoalkyldimethylbenzylammonium chlorides, dialkylethylmethylammonium ethosulfates, trialkylmethylammonium chlorides, polyoxyethylenemonoalkylmethylammonium chlorides, and diquaternaryammonium chlorides; the ammonium functional surfactants sold by Akzo Nobel N.V. of Amsterdam, the Netherlands, under the trade names ETHOQUAD®, ARQUAD®, and DUOQUAD®; and mixtures thereof. Of particular use in forming oil-in-water emulsions for polymerization of the zwitterionic polymers of the invention are the ETHOQUAD® surfactants, for example, ETHOQUAD® C/12, C/25, C/12-75, and the like. In some embodiments, ETHOQUAD® C/25 is usefully employed to make high solids emulsions in water of the monomers employed to make the polymers described herein.

Where a cationic surfactant is employed in an oil-in-water emulsion polymerization reaction, it is employed in an amount of about 0.1 wt % to 6.0 wt % based on the total weight of the monomers, or at about 0.3 wt % to 4.0 wt % of the monomers, or in various intermediate levels such as 1.1 wt %, 1.2 wt %, 1.3 wt %, 1.4 wt %, 1.5 wt %, 1.6 wt %, 1.7 wt %, 1.8 wt %, 1.9 wt %, 2.1 wt %, 2.2 wt %, and all other such individual values represented by 0.1 wt % increments between 1.0 and 6.0 wt %, and in any range spanning these individual values in 0.1 wt % increments, such as 2.3 wt % to 4.6 wt %, 4.5 wt % to 4.7 wt %, and the like.

Non-limiting examples of zwitterionic surfactants useful in forming oil-in-water emulsions of the monomers employed to form the polymers described herein include betaines and sultaines, such as cocamidopropyl betaine, hydroxysultaine, and cocamidopropyl hydroxysultaine; others include lecithin, 3-[(3-Cholamidopropyl)dimethylammonio]-1-propanesulfonate (CHAPS), and sodium 2-[1-(2-hydroxyethyl)-2-undecyl-4,5-dihydroimidazol-1-ium-1-yl]acetate (sodium lauroamphacetate). Where a zwitterionic surfactant is employed in an oil-in-water emulsion polymerization reaction, it is employed in an amount of about 0.01 wt % to 10.0 wt % based on the total weight of the monomers, or at about 0.3 wt % to 6.0 wt % of the monomers, or in various intermediate levels such as 1.1 wt %, 1.2 wt %, 1.3 wt %, 1.4 wt %, 1.5 wt %, 1.6 wt %, 1.7 wt %, 1.8 wt %, 1.9 wt %, 2.1 wt %, 2.2 wt %, and all other such individual values represented by 0.1 wt % increments between 1.0 and 10.0 wt %, and in any range spanning these individual values in 0.1 wt % increments, such as 2.3 wt % to 4.6 wt %, 4.5 wt % to 4.7 wt %, and the like.

In some embodiments, emulsion polymerization of the monomers employed to make the polymers having ammonium functionality is carried out by blending the monomers, surfactant(s), and a UV initiator in water, followed by irradiating with UV radiation at a wavelength corresponding to the preferred decomposition wavelength of the selected initiator for a period of time. In other embodiments, emulsion polymerization of the monomers is carried out by blending the monomers, surfactant, and a thermal initiator in water, followed by heating the emulsion to a temperature where decomposition of the thermal initiator is induced at a suitable rate. In some embodiments where methacrylic acid or acrylic acid are employed in the monomer mixture, sodium, lithium, ammonium, or potassium hydroxide is added to the monomer mixture to neutralize the acid functionality and form the corresponding salt. In other embodiments, such neutralization is carried out after completion of the polymerization reaction. Neutralization, in embodiments, means adjusting the pH of the water phase from between about 2 and 3 to between about 4 and 7, for example between about 5 and 6.

In some embodiments, ETHOQUAD® C/25 is usefully employed to make high solids emulsions of the monomers. In this context, "solids" are defined as all ingredients of the emulsion other than water. High solids emulsions are formed, for example, at about 15 wt % and 60 wt % total solids in water, or about 25 wt % to 60 wt % total solids in water, or about 30 wt % to 50 wt % solids in water, or in various intermediate levels such as 16 wt %, 17 wt %, 18 wt %, 19 wt %, 20 wt %, 21 wt %, 22 wt %, 23 wt %, 24 wt %, 26 wt %, 27 wt %, and all other such individual values represented by 1 wt % increments between 15 wt % and 60 wt % solids in water, and in any range spanning these individual values in 1 wt % increments, such as 23 wt % to 46 wt %, 45 wt % to 57 wt %, and the like.

In general, conditions of emulsion polymerization and methodology employed are the same or similar to those employed in conventional emulsion polymerization methods. In some embodiments, the oil-in-water emulsion polymerization is carried out using thermal initiation. In such embodiments, one useful polymerization initiator is V-50 (obtained from Wako Pure Chemical Industries Ltd. of Osaka, Japan). In some such embodiments, the temperature of the emulsion is adjusted prior to and during the polymerization to about 30° C. to 100° C., for example to about 40° C. to 80° C., or about 40° C. to 60° C., or about 45° C. to 55° C. Agitation of the emulsion at elevated temperature is carried out for a suitable amount of time to decompose substantially all of the thermal initiator, and react substantially all of the monomers added to the emulsion to form a polymerized emulsion. In some embodiments, elevated temperature is maintained for a period of about 2 hours to 24 hours, or about 4 hours to 18 hours, or about 8 hours to 16 hours. During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques, such as gas chromatographic analysis of residual monomer content, will inform the skilled artisan regarding the completion of polymerization.

In other embodiments, the polymerization is a solvent polymerization, wherein the monomers form a solution in a solvent or mixture of two or more solvents. The solvents include water but in some embodiments a non-aqueous solvent or solvent mixture is employed. Examples of suitable solvents and solvent mixtures include, in various embodiments, one or more of ethanol, methanol, toluene, methyl ethyl ketone, ethyl acetate, isopropyl alcohol, tetrahydrofuran, 1-methyl-2-pyrrolidinone, 2-butanone, acetonitrile, dimethylformamide, dimethyl sulfoxide, dimethylacetamide, dichloromethane, t-butanol, methyl isobutyl ketone, methyl t-butyl ether, and ethylene glycol. In general, conditions of solvent polymerization and methodology employed are the same or similar to those employed in conventional solvent polymerization methods. In some embodiments, the solvent polymerization is carried out using thermal initiation. In such embodiments, one useful polymerization initiator is VAZO® 67. In some such embodiments, the temperature of the monomer solution is adjusted prior to and during the polymerization to about 30° C. to 150° C., for example to about 50° C. to 1300° C., or about 60° C. to 120° C., or about 60° C. to 100° C. Agitation of the solution at elevated temperature is carried out for a suitable amount of time to decompose substantially all of the thermal initiator, and react substantially all of the monomers to form a polymer solution. In some embodiments, elevated temperature is maintained for a period of about 2 hours to 24 hours, or about 4 hours to 18 hours, or about 8 hours to 16 hours. During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques such as gas chromatographic analysis of residual monomer content will inform the skilled artisan regarding the completion of polymerization.

In some embodiments, the solvent polymerization as described above is a UV polymerization; that is, a UV initiator is employed instead of a thermal initiator and the polymerization is carried out substantially as described for the solvent polymerization except that the solution is irradiated with UV radiation at a wavelength corresponding to the preferred decomposition wavelength of the selected initiator for a period of time. In some embodiments, solution UV polymerization is carried out without adding heat to the solution. In other embodiments, heat is further added to the solution, for example to facilitate mixing as viscosity of the solution increases during the polymerization process.

In some embodiments, a dust suppression coating polymer composition is combined with an alkylalkoxysilane (regardless of whether the polymer includes silyl functional groups). The alkylalkoxysilane can contain a hydrocarbon tail for better wetting with the hydrophobic asphalt. A siloxy bond can form between a granule surface and the alkylalkoxysilane via condensation reaction leaving the hydrophobic hydrocarbon tail on the granule surface. The transformation of the hydrophilic surface into a hydrophobic oily surface improves wetting of the granule surface by the asphalt. The coating composition may contain any suitable ratio of dust suppression coating polymer to alkylalkoxysilane. For example, the composition may contain a ratio of the dust suppressing compound to the alkylalkoxysilane of about 4:1, 3:1, 2:1, 1:1, 1:2, 1:3, 1:4, or the like.

Any suitable alkylalkoxysilane may be used in the coating composition. Preferably, the alkylalkoxysilane, if present, is present in an amount that does not interfere with (e.g., block) the quaternary ammonium functionality. One example of a suitable alkylalkoxysilane is isooctyltrimethoxysilane $[(MeO)_3SiCH_2C(CH_3)_2CH_2C(CH_3)_2]$ or an oligomer thereof or containing a portion thereof, such as SILRES® BS 68 available from Wacker Chemical Corporation, Adrian, Mich. USA.

In the Examples that follow, it is shown that quaternary ammonium-containing polyacrylate aqueous dispersions exhibit dust suppression. These aqueous dispersions may also include silane and silanol-functional moieties, epoxide moieties, or both. The reactive silane and silanol functional groups can enable strong siloxane bonding on mineral roofing granules. The epoxide moieties can possibly form chemical bonds with reactive species in asphalt (e.g., as discussed above under the heading "Adhesion Promoter Coating Composition").

Granules treated with formulations comprising one of these materials and an alkylsiloxane oligomer exhibited both improved dust suppression relative to the control and enhanced affinity between the granule surface and the roofing asphalt with both unmodified and PPA-modified asphalt.

Granules treated with formulations comprising a silanol-functional version of these materials, an alkylsiloxane oligomer, and an epoxy-functional silane did not compromise the improved adhesion the epoxy silane provides with PPA-modified asphalt. These same combinations also exhibited improved dust suppression compared to either the control or the combination of an alkylsiloxane oligomer and an epoxy-functional silane with the conventional dust suppressant material, 3M Fastbond™ Insulation Adhesive 49.

Initial testing with an Acrylic-Zwitterionic Amphiphilic Polymer (A-ZAP emulsion polymer) as described in U.S. Patent Publication 2014/0170362, demonstrated that a charged acrylic emulsion of this sort provided improved dust suppression relative to a current commercial control dust suppressant solution, 3M Fastbond™ Insulation Adhesive 49. As described above under the heading "Adhesion Promoter Coating Compositions" and below in Example 1, it has been demonstrated that glycidyl-functional silane surface treatments can provide enhanced adhesion between granule surface and asphalt. When combined, however, A-ZAP and glycidyl-functional silane surface treatments resulted in a surface with low dust, but no improved affinity to asphalt. The Examples below (Example 2) describe formulations comprising modifications of A-ZAP that exhibit both enhanced dust suppression relative to the control and enhanced affinity to asphalt. The Examples below further describe formulations that exhibit enhanced dust suppression that do not compromise the adhesion characteristics of a glycidyl-functional silane surface treatment.

A-ZAP and other quaternary ammonium moiety containing acrylic polymers have been found to provide both beneficial dust suppression and improved adhesion between mineral granules and asphalt, as well as improved wetting characteristics, when combined with various components. In various exemplary embodiments, a coating composition providing improved adhesion and dust suppression characteristics includes an acrylic polymer having a quaternary ammonium moiety, a nonionic monomer, and may further include an acidic monomer. Suitable acidic monomers include, for example, acrylic acid, methacrylic acid, vinyl phosphonic acid, vinyl sulfonic acid, 2-Acrylamido-2-methylpropane sulfonic acid, suitable combinations thereof, and other suitable components as known in the art. Exemplary nonionic monomers include, for example, N-vinyl pyrrolidone, isobutyl (meth)acrylate, n-butyl (meth)acrylate, isopropyl (meth)acrylate, n-propyl (meth)acrylate, methyl (meth)acrylate, ethyl (meth)acrylate, vinyl acetate, hydroxyethyl (meth)acrylate, hydroxypropyl (meth)acrylate, octadecyl (meth)acrylate, stearyl (meth)acrylate, dimethyl acrylamide, N-(hydroxymethyl)-acrylamide, dimethylaminoethyl (meth)acrylate, methoxy polyethylene glycol (meth)acrylate, polydimethylsiloxane (meth)acrylate), KF 2001 (mercapto modified dimethylsiloxane), perfluorobutyl sulfonamido n-methyl ethyl acrylate, isobornyl (meth)acrylate, amidol (meth)acrylate, hexafluoropropylene oxide oligomer, isooctyl(meth)acrylate, 2-ethyl hexyl (meth)acrylate, 2-hydroxy ethyl (meth)acrylate, suitable combinations thereof, and other suitable components as known in the art An exemplary coating composition further includes an ionic crosslinking agent that may interact with, for example, carboxyl functional groups. In an exemplary embodiment, the coating composition further includes a zirconium species. Zirconium species can develop strong ionic bonds with carboxyl moieties and/or hydrogen bonds with hydroxyl moieties. In various exemplary embodiments, the zirconium species may include zirconium acetate, ammonium zirconium carbonate, potassium zirconium carbonate, triethanolamine zirconium, sodium salt of zirconium lactate, suitable combinations thereof, and other suitable materials known in the art.

In some exemplary embodiments, zirconium moieties may include bridging hydroxyl groups within its own structure. Without being bound by theory, such zirconium species are believed to enable crosslinking of the acrylic polymer, improved adhesion to an asphalt, for example, and improved attachment to a porous surface of a roofing granule. Linkages may occur, for example via carboxyl moieties of the acrylic polymer, carboxyl and hydroxyl moieties present in an asphalt to which a coated substrate, such as a roofing granule, is in contact with, and hydroxyl groups present on a substrate or coating of the substrate, such as a silica coating. In an exemplary embodiment, polymeric zirconium structures, formed from zirconium acetate for example, grow as acetate groups are stripped from zirconium acetate and as ol (hydroxyl) bridges are created. Such reactions may be catalyzed by the presence of alkaline earth oxides, such as magnesium oxide, calcium oxide, and other oxides.

Coating compositions including an acrylic polymer having a quaternary ammonium moiety and a carboxyl moiety, along with zirconium, may provide particular advantages when provided with a silicate coating on a roofing granule, such as a mineral roofing granule. Silicate coatings typically contain alkaline oxides, and mineral substrates may contain magnesium oxide and calcium oxide, for example. In an exemplary embodiment, zirconium crosslinkers, such as zirconium acetate, are able to be bridged by ol bridges link to the mineral substrate surface. Hydroxyl groups are available for hydrogen bonding with silanol groups of the silicate surface. The polymerized zirconium complex, or the crosslinked acrylic polymer and zirconium complex may be able to mechanically entangle within a porous silicate coating, and/or may be able to link by hydrogen bonding to silanol moieties, for example provided by SILRES BS68 in an exemplary composition. Attachment between a substrate and/or coated substrate and silanol moieties is believed to improve adhesion between the substrate or coated substrate with an asphalt, for example.

In various exemplary embodiments, an acrylic polymer includes a quaternary ammonium moiety and between 0.5 wt % and 5 wt %, 1 wt % and 4 wt %, or about 2 wt % carboxyl moiety. Zirconium, such as zirconium acetate, is provided in an amount to yield a stoichiometric ratio of zirconium to carboxyl moiety between about 0.5:1 and 20:1, 1:1 and 16:1, or between about 1:1 and 10:1. Such loadings provide a combination of improved adhesion and dust suppression, without resulting in undesirable shedding and/or increased dust creation. Accordingly, coating compositions including carboxyl moieties in an acrylic polymer having a quaternary ammonium moiety and zirconium are observed to provide both improved adhesion and dust suppression characteristics, as set forth further in the Examples. These advantages are particularly evident when such a coating is first provided on a substrate, such as a roofing granule, and the coated substrate is subsequently partially embedded in an asphalt.

The adhesion promoter coating compositions and dust suppression coating compositions described herein may be used for any suitable purpose. In some embodiments, one or more of such coating compositions are used to coat roofing granules. In some embodiments, the coated roofing granules are incorporated into roofing materials. Roofing materials often include matting, asphalt and roofing granules.

A variety of materials may be utilized as the matting for roofing materials. In general, the matting may comprise a non-woven matting of either fiberglass or cellulose fibers. Fiberglass matting is often used in the asphalt roofing products industry. However, cellulose matting, sometimes referred to as organic matting or rag felt, may also be utilized.

Fiberglass matting is commercially available from Owens-Corning Fiberglass Corporation, Toledo, Ohio and Manville Roofing Systems, Denver, Colo. It is recognized that any fiberglass mat with similar physical properties could be used with satisfactory results. Generally, the fiberglass matting is manufactured from a silicate glass fiber blown in a non-woven pattern in streams of about 30-200 micrometers in diameter with the resultant mat approximately 1-5 millimeters in thickness.

Cellulose felt (dry felt) is typically made from various combinations of rag, wood and other cellulose fibers or cellulose-containing fibers blended in appropriate proportions to provide the desirable strength, absorption capacity and flexibility.

Roofing asphalt, sometimes termed "asphalt flux", is a petroleum based fluid comprising a mixture of bituminous materials. In the manufacture of roofing materials, it is generally desirable to soak the absorbent felt or fiberglass matting until it is impregnated or saturated to the greatest possible extent with a "saturant" asphalt, thus the asphalt should be appropriate for this purpose. Saturant asphalt is high in oily constituents which provide waterproofing and other preservatives. Matting saturated with saturant asphalt are generally sealed on both sides by application of a hard or more viscous "coating asphalt" which itself is protected by the covering of mineral granules. In the case of fiberglass mat based asphalt roofing products, it is well understood that the coating asphalt can be applied directly to the unsaturated fiberglass mat.

The asphalts used for saturant asphalt and the coating asphalt are generally prepared by processing the asphalt flux in such a way as to modify the temperature at which it will soften. In general, the softening point of saturant asphalt may vary from about 37° C. to about 72° C., whereas the softening point of desirable coating asphalt may run as high as about 127° C. The softening temperature varies among the roofing industry and may be modified for application to roof systems in varying climates.

In embodiments, polyphosphoric acid (PPA) may be added to the asphalt to modify the grade of the asphalt. When asphalt that has been modified with PPA is blown with hot air, the asphalt can be blown for a longer period of time to a higher softening point with less reduction in penetration depth at room temperature. See, e.g., U.S. Pat. No. 7,951,239. This stiffening effect may be due to preferential reaction between the asphaltenic phase and the PPA.

Roofing granules are generally applied to the surface of the asphalt on, for example, a roofing shingle. In general, they comprise colored slate or rock granules either in natural form or artificially colored by a ceramic coating.

In general, any mineral material which is opaque, dense, and properly graded by screening for maximum coverage can be used conventionally and in roofing products. Generally, these materials are crushed and graded to a desired size. Any size granule or distribution of sizes may be useful in the roofing material industry may be used. In various exemplary embodiments, granules have a size between about 200 to 1680 micrometers, or between 420 to 1500 micrometers, or between about 40 to 12 US mesh. Methods to color such granules are generally known in the art. See, for example, Beyard et al. in U.S. Pat. No. 3,752,696.

Suitable base granules can be selected from a wide class of relatively porous or non-porous and weather-resistant rock or mineral materials. Suitable minerals may include igneous rock, trap rocks, slates, argillite, greystone, greenstone, quartz, quartzite, certain granites or certain synthetic granules made from clay or other ceramics. The granule may be coated with a variety of materials to provide desirable properties. These coatings may be continuous or discontinuous. Multiple coatings may be applied either sequentially or simultaneously.

In some embodiments, granules may be made photocatalytic. Photocatalysts are further described in U.S. Pat. Nos. 6,569,520; 6,881,701 and US Patent Publication US2005/0142329, assigned to 3M Innovative Properties Company. Upon activation or exposure to sunlight, photocatalysts are thought to establish both oxidation and reduction sites. These sites are thought to produce highly reactive species such as hydroxyl radicals that are capable of preventing or inhibiting the growth of algae or other biota on the coated article, especially in the presence of water. Many photocatalysts conventionally recognized by those skilled in the art are suitable for use with the present invention. Specific examples of photocatalysts include transition metal photocatalysts. Examples of suitable transition metal photocatalysts include $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$, and the like, and combinations thereof. Particularly preferred photocatalysts include crystalline anatase $TiO_2$, crystalline rutile $TiO_2$, crystalline ZnO and combinations thereof.

To improve spectral efficiency, photocatalysts may be doped with a nonmetallic element, such as C, N, S, F, or with a metal or metal oxide, such as Pt, Pd, Au, Ag, Os, Rh, $RuO_2$, Nb, Cu, Sn, Ni, Fe, or combinations thereof. In some embodiments, granules may be made anti-microbial. Examples of such functionalized roofing granules can be found, for example in WO 02/10244. In some embodiments, the granule is made antimicrobial with the addition of cuprous oxide. See, e.g., U.S. Pat. No. 3,528,842.

In some embodiments, roofing granules exhibit reflection of infrared light. Examples of such functionalized roofing granules can be found, for example, at United States Patent Application Publication 2005/0142329. Generally, such granules provide a non-white construction surface having a reflectivity of at least about 20% at substantially all points in the wavelength range between 770 and 2500 nm.

A variety of additives, such as stabilizers and fillers, may be utilized in asphalt-based roofing systems. For example, additives may be added to the adhesion promoting coating on the granule, for example stabilizers, antioxidants, surfactants, and the like. In addition, igneous rock mineral fines, silica, slate dust, talc, micaceous materials, dolomite, limestone and trap rock may be utilized as stabilizers or fillers in the coating asphalt.

These compounds are utilized in conventional systems and they may be used in improved systems containing adhesion promoter or dust suppression coated granules described herein. Such materials render the asphalt base improved with respect to shatter resistance, shock resistance, and tensile strength. In addition, they provide fire protection. Also, they provide raw material cost savings and improved weathering characteristics. Additives may also include reflective particles, for example additives that reflect infrared light. Examples include those described in U.S. Patent Application Number 2007/021825, assigned to 3M Innovative Properties Company.

Providing one or more coatings, as described herein, on a surface of a roofing granule, mineral filler, or other suitable substrate provides several unique features and benefits. For example, the presence of a covalent or ionic reactive moiety on a surface of the granule or substrate, as opposed to mixing into an asphalt that the granule or substrate is embedded in, allows independent tailoring of the rheology of the asphalt and granule and/or coating. Furthermore, reaction between a coating composition and asphalt may be more easily controlled because reaction cannot occur until the coating, e.g. a coated granule or mineral filler, and asphalt are brought into contact with one another.

Referring now to FIG. 1, a schematic drawing of an embodiment of a coated roofing granule 100 is depicted. The coated granule 100 includes a base granule 101 and a coating 103 on the base granule. The base granule 101 and coating 103 may be a roofing granule and coating as described above.

Figure 2:
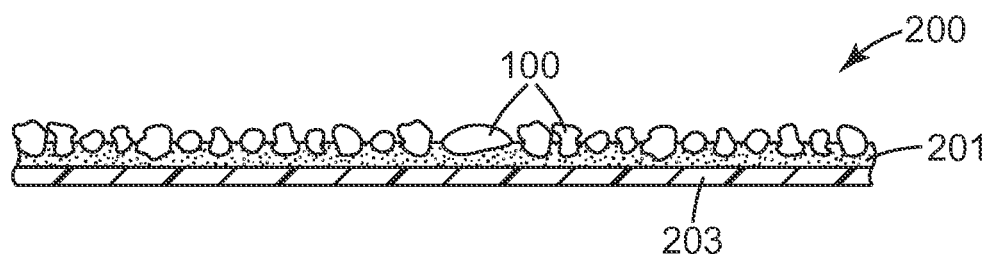
FIG. 2 is a schematic drawing of a coated granule included in a roofing article.

Referring now to FIG. 2, a schematic drawing of an embodiment of a roofing article 200 is shown. The roofing article 200 includes a substrate 203 and an asphalt layer 201 disposed on the substrate 203. The roofing article 200 also includes roofing granules 100 partially embedded in the asphalt layer 201. The roofing article 200, asphalt layer 201, substrate 203 and granule 100 may be as described above. For example, if the roofing article 200 is a roofing shingle, the substrate 201 may be, for example, a fiberglass mat or felt as described above.

Definitions

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. As used herein, "consisting essentially of," as it relates to a composition, article, system, method or the like, means that the components of the composition, article, system, method or the like are limited to the enumerated components and any other components that do not materially affect the basic and novel characteristic(s) of the composition, article, system, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

As used herein, the term "about" encompasses the range of experimental error that occurs in any measurement.

As used herein, an "adhesion compound" is a compound that is capable of forming a covalent or ionic bond with a base roofing granule and with a reactive group in asphalt. The adhesive compound may be included in an adhesion promoter coating composition. The adhesion promoter coating composition may be applied to a base roofing granule to form a coated roofing granule.

For the purposes of this disclosure, reference to a compound includes reference to salts of the compound, hydrates of the compound, polymorphs of the compound, isomers of the compound (including constitutional isomers and stereoisomers such as enantiomers and diastereomers), and the like.

Incorporation by reference: Any patent or non-patent literature cited herein is hereby incorporated herein by reference in its entirety to the extent that it does not conflict with the disclosure presented herein.

In the detailed description above several specific embodiments of compounds, compositions, articles, systems and methods are disclosed. It is to be understood that other embodiments are contemplated and may be made without departing from the scope or spirit of the present disclosure. The detailed description, therefore, is not to be taken in a limiting sense.

While most of this disclosure relates to roofing granules, it will be understood that the adhesion promoter coating or dust suppression coatings described herein may be used for any suitable purpose. For example, adhesion promoter coatings may be used to promote adhesion between any suitable first substrate and any suitable second substrate; particularly any first substrate that may form a siloxane bond with a silane moiety and any second substrate having nucleophile moieties. By way of further example, dust suppression coatings may be used to suppress any suitable dust, such as soil dust, mineral granule dust, or the like. Coatings as described herein may also suitable be used in other asphaltic compositions to improve performance, for example in roadways, construction materials, and other suitable materials, and may be coated or incorporated into such materials with mineral filler, for example.

In the following non-limiting examples are provided that illustrate embodiments of the compounds, compositions, articles, systems, and methods described above. These examples are not intended to provide any limitation on the scope of the disclosure presented herein. All parts, percentages, ratios, etc. in the examples and the rest of the specification are by weight, unless otherwise noted.

EXAMPLES

Example 1

Adhesion Promotion with Compound Containing Alkoxysilane and Electrophile

Table 1 below lists the materials used in Example 1.

TABLE 1

Materials used in Example 1

|  | Manufacturer | CAS# | Comments |
|---|---|---|---|
| 3-Glycidoxypropyltriethoxysilane | Gelest | 2602-34-8 |  |
| β-(3,4-epoxycyclohexyl)ethyltriethoxysilane | Momentive | 10217-34-2 | CoatOSil 1770 |
| Epoxidized polybutadiene | Cray Valley | 129288-65-9. | BD 605E |
| 3-Isocyanatopropyltriethoxysilane | Gelest | 24801-88-5 |  |
| 3-Mercaptopropyltriethoxysilane | Gelest | 14814-09-6 |  |
| 2,2-Dimethoxy-2-phenylacetophenone | Ciba | 24650-42-8 | Irgacure 651 |
| Silres ® BS68 | Wacker Silicones | 34396-03-7 77-58-7 67-56-1 | Mixture of isooctyl trimethoxy silane di-n-butyltindilaurate |
| Di-n-butyltindilaurate | Alfa Aesar | 77-58-7 |  |
| L500 Napthenic Oil | Cross Oil and Refining | 64742-52-5 |  |
| 3M WA9300 Roofing Granules, "kiln" | 3M |  | White roofing granules |
| 3M Fastbond ™ Insulation Adhesive 49 | 3M |  | Polyacrylate adhesive |
| Dow D.E.R. ™ 331 Epoxy Resin | Dow | 25085-99-8 |  |
| 3-Aminopropyltriethoxysilane | Evonik | 919-30-2 | Dynasylan AMEO |

Material Synthesis

1. Synthesis of 10% Silane Mod ePB: Epoxidized polybutadiene (BD 605E) modified with 3-Isocyanatopropyltriethoxysilane (164223-64-A): In a 100 ml glass jar, 50.0 g of epoxidized polybutadiene (BD 605E), 10.51 g of 3-isocyanatopropyltriethoxysilane, and a trace amounts (<0.05 g) of di-n-butyltindilaurate were charged. The mixture was agitated with a mechanical stirrer at room temperature for 10 minutes. Then it was heated to 80° C. by using a hot oil bath while maintaining vigorous stirring. The reaction temperature was maintained for 40 min and then cooled down to room temperature. The product was stored in a tightly sealed vial to prevent any hydrolysis reaction.

2. Synthesis of 20% Silane Mod ePB: Epoxidized polybutadiene (BD 605E) modified with 3-Isocyanatopropyltriethoxysilane (164223-64-B): In a 100 ml glass jar, 50.0 g of epoxidized polybutadiene (BD 605E), 21.02 g of 3-isocyanatopropyltriethoxysilane, and a trace amounts (<0.05 g) of di-n-butyltindilaurate were charged. The mixture was agitated with a mechanical stirrer at room temperature for 10 minutes. Then it was heated to 80° C. by using a hot oil bath while maintaining vigorous stirring. The reaction temperature was maintained for 40 min and then cooled down to room temperature. The product was stored in a tightly sealed vial to prevent any hydrolysis reaction.

3. Synthesis of 30% Silane Mod ePB: Epoxidized polybutadiene (BD 605E) modified with 3-Mercaptopropyltriethoxysilane (164223-66): In a 100 ml glass jar, 50.0 g of epoxidized polybutadiene (BD 605E) and 0.1g of 2,2-Dimethoxy-2-phenylacetophenone were charged. The mixture was agitated with a mechanical stirrer at room temperature until all 2,2-Dimethoxy-2-phenylacetophenone dissolved into the liquid polymer. When a homogeneous mixture was obtained, 15.0 g of 3-Mercaptopropyltriethoxysilane was added to the mixture. After agitating the reaction mixture for 10 minutes at room temp, UV irradiation on the reaction mixture was conducted for 30 min (Sylvania Blacklight Blue F15T8/BLB, 15, low intensity UV lamp) while maintaining vigorous stirring. After UV irradiation, the product was stored in a tightly sealed vial to prevent any hydrolysis reaction.

Procedure 1: Granule Treatment—Control Lots: One kilogram of 3M white roofing granules (WA9300) containing no post treatment are heated to 360° F. and then mixed with 15 grams of water and 0.5 grams of 3M Fastbond™ Insulation Adhesive 49. After 45 seconds of mixing, a mixture of 0.5 gms of napthenic oil and 0.1 gm Silres® BS68 are added and the mixing continues for a total of 5 minutes. The granules are then heat treated at 176 degrees F. for one hour.

For the experimental lots, the epoxy-functional silane component was added in place of or in addition to Silres® BS 68 to equal a total of 0.2 lb/ton adhesion promoter in all examples.

Procedure 2: Granule Water Repellency: Water repellency is tested by placing 25.0 g of treated granules into a 20 ml test tube, which is then inverted onto a flat surface, thereby forming a cone-shaped aggregate pile. A 15 mm diameter indent was then created by pressing the bottom of the test tube onto the tip of the cone-shaped granule aggregate pile. About 3 to 5 drops of DI water is placed into the indent, and time was recorded until the water disappeared.

Procedure 3: Granule Asphalt Wettability: Wettability is tested by placing 10 gms of treated granules in 50 ml of DI water. 2 grams of wettability asphalt (SC800, cutback, purchased from The Ashland Petroleum Company, St. Paul Park, Minn. through the City of St. Paul Public Works) is mixed into the granules using a spatula and constant stirring for one minute. An estimate is made of the percentage of granule surface covered by asphalt.

Procedure 4: Granule to Asphalt Adhesion "Texas Boil" Test: The Texas Boil Test is a modification of Texas Method Tex-530-C or ASTM D 3625, "Effect of Water on Bituminous-Coated Aggregate Using Boiling Water" Instead of paving aggregate, #11 white roofing granules (+16 mesh) are used. 150 gms of granules and 6.8 grams of asphalt are heated to 325 degrees F. for one hour. The granules are stirred into the asphalt until evenly coated and allowed to cool. The asphalt/granule mix is boiled for 10 minutes. After cooling, the mixture is allowed to dry overnight. An ointment tin is filled with the granule plus asphalt mix and another is filled with the boiled and dried granule plus asphalt mix. A colorimeter is used to measure L* of the treated granules, L*(a), L* of the granules plus asphalt, L*(b), and L* of the boiled granules plus asphalt, L*(c). The % asphalt loss is calculated according to the equation:

$$\% \text{ asphalt lost}=(L^*(c)-L^*(b))/(L^*(a)-L^*(b))\times 100$$

Procedure 5: Granule to Asphalt Adhesion Rub Test: The dry rub test is a standard test method for determination of granular adhesion to mineral-surfaced roofing under conditions of abrasion. The procedure is described in ASTM standard D4977 "Test Method for Granule Adhesion to Mineral Surfaced Roofing by Abrasion". Dry rub tests were conducted in compliance with this standard. The Specimen to be wet rub tested was placed in a soak tank with water at room temperature for a period of 7 days. When the soak period ended, a Specimen to be tested was removed from the soak tank and gently blotted followed by weighing and recording the initial weight. The rub test is then conducted as outlined in the ASTM standard cited above, followed by recording the final weight. The reported mean dry loss and mean wet loss are an average of 9 Specimens tested. Normalized wet rub data was calculated based on the following relationship:

$$\text{Wet Rub (Normalized)}=0.25/\text{Dry Rub}\times\text{Wet Rub}.$$

Results are presented in Table 2 below. Control lots are indicated in Table 2. These lots contain only BS68 as the adhesion promoter and 3M Fastbond™ Insulation Adhesive 49 as a dust suppressant and include no epoxy-functional silane. The composition of each control lot is the same. Results for multiple control lots are presented in Table 2.

TABLE 2

Results for Example 1

| Ex. 1 specimens | Epoxy-Silane Description | BS68, lb/ton | Water Repellency (min.) | Asphalt Wettability | TX Boil, % Reg Asphalt Loss | TX Boil, % PPA Asphalt Loss | Rub Test, Mean Dry Loss, gms | Rub Test, Mean Wet Loss, gms | Rub Test, Normalized Wet Loss, gms |
|---|---|---|---|---|---|---|---|---|---|
| 1 | 10% Silane Mod ePB | 0.000 | 2 | 95 | | 13.3 | | | |
| 2 | 20% Silane Mod ePB | 0.000 | 10 | 95 | | 10.6 | | | |
| 3 | 30% Silane Mod ePB | 0.000 | 3 | 100 | | 2.1 | | | |
| 4 | 10% Silane Mod ePB | 0.025 | 20 | 100 | 10.1 | 3.6 | | | |

TABLE 2-continued

Results for Example 1

| Ex. 1 specimens | Epoxy-Silane Description | BS68, lb/ton | Water Repellency (min.) | Asphalt Wettability | TX Boil, % Reg Asphalt Loss | TX Boil, % PPA Asphalt Loss | Rub Test, Mean Dry Loss, gms | Rub Test, Mean Wet Loss, gms | Rub Test, Normalized Wet Loss, gms |
|---|---|---|---|---|---|---|---|---|---|
| 5 | 20% Silane Mod ePB | 0.025 | 30 | 100 | 6.0 | 1.7 | | | |
| 6 | 30% Silane Mod ePB | 0.025 | 11 | 100 | 9.9 | 2.6 | | | |
| 7 | None - "control" | 0.200 | 120+ | 100 | 16.0 | 10.0 | | | |
| 8 | None - "control" | 0.200 | 120+ | 95 | 26.0 | 33.1 | | | |
| 9 | Gelest Glycidoxypropyl Triethoxysilane | 0.140 | 120+ | 100 | 16.0 | 9.8 | | | |
| 10 | Gelest Glycidoxypropyl Triethoxysilane | 0.100 | 120 | 95 | 13.9 | 7.3 | | | |
| 11 | GelestGlycidoxypropyl Triethoxysilane | 0.070 | 120+ | 100 | 21.4 | 10.0 | | | |
| 12 | Gelest Glycidoxypropyl Triethoxysilane | 0.000 | 1. | 20 | 41.0 | 36.8 | | | |
| 13 | None - "control" | 0.200 | 120+. | 100 | 25.5 | 17.8 | | | |
| 14 | None - "control" | 0.200 | 120+ | 100 | 18.8 | 17.8 | 0.82 | 5.05 | 1.54 |
| 15 | Gelest Glycidoxypropyl Triethoxysilane | 0.150 | 120+ | 100 | 13.8 | 8.4 | 0.53 | 1.62 | 0.77 |
| 16 | Gelest Glycidoxypropyl Triethoxysilane | 0.100 | 120+ | 100 | 19.9 | 10.9 | 0.38 | 1.01 | 0.66 |
| 17 | None - "control" | 0.200 | 60+ | 100 | 18.4 | 14.2 | | | |
| 18 | Momentive CoatOSil | 0.100 | 60+ | 100 | 9.9 | 7.6 | | | |
| 19 | 1:1 epoxy resin + Dynasylan AMEO | 0.000 | 60+ | 95 | 11.3 | 6.7 | | | |
| 20 | 1:1 epoxy resin + Dynasylan AMEO | 0.100 | 60+ | 100 | 8.0 | 6.6 | | | |
| 21 | 2:1 epoxy resin + Dynasylan AMEO | 0.000 | 60+ | 100 | 18.7 | 12.3 | | | |
| 22 | 2:1 epoxy resin + Dynasylan AMEO | 0.100 | 60+ | 100 | 14.9 | 8.8 | | | |

Example 1, Specimens 7, 8, 13, 14, and 17 are all Control lots which provide a basis of comparison for the epoxy-functional silane containing Specimens. Note that the control lot treatment formulation provides adequate water repellency (60 minutes and greater) and adequate asphalt wettability (95-100%). Granule adhesion for the control formulation measured by the Texas Boil test has an average value of 20.9% loss when using regular asphalt and 18.6% loss when using PPA modified asphalt.

Example 1, Specimens 1 through 6 demonstrate improved Texas Boil results when the coating treatment comprises a silane modified epoxidized polybutadiene.

Example 1, Specimens 9 through 12, 15, 16, and 18 demonstrate improved Texas Boil results when the coating treatment comprises glycidoxypropyl triethoxy silane or β-(3,4-epoxycyclohexyl)ethyltriethoxysilane in combination with Silres® BS68.

Example 1, Specimens 19 through 22 demonstrate improved Texas Boil results using a mixture of Dow D.E.R.™ 331 epoxy resin and Dynasylan® AMEO applied alone or in combination with Silres® BS68 as the coating treatment.

Example 1, Specimens 14 through 16 were evaluated for granule adhesion using the Rub Test. Specimens 15 and 16 demonstrate improved adhesion (lower granule loss) than the control Specimen 14.

Example 2

Dust Suppression with Polymer Containing Quaternary Ammonium Moiety

Table 3 below lists the materials used in Example 2.

TABLE 3

Materials Used in the Example 2

| Commercial Material | Manufacturer | CAS# | Comments |
|---|---|---|---|
| SILRES ® BS 68 | Wacker | 34396-03-7 77-58-7 | Mixture of 1. isooctyl trimethoxy silane 2. Di-n-butyltindilaurate |
| L500 Napthenic Oil | Cross Oil and Refining | 64742-52-5 | |
| 3M WA9300 Roofing Granules, "kiln" | 3M | | White roofing granules |
| 3M Fastbond ™ Insulation Adhesive 49 | 3M | | Polyacrylate adhesive |
| CoatOSil 1770 β-(3,4-epoxycyclohexyl)ethyltriethoxysilane) | Momentive | 10217-34-2 | CoatOSil 1770 |
| Geniosil GF82 (3-Glycidoxypropyltriethoxysilane) | Wacker Silicones | 2602-34-8 | |

TABLE 3-continued

Materials Used in the Example 2

| Commercial Material | Manufacturer | CAS# | Comments |
|---|---|---|---|
| A-ZAP | 3M | | As described in U.S. patent application No. 14/102,258 |
| DMAEA-MCl: Dimethylaminoethyl Acrylate Methyl Chloride | BASF | 44992-01-0 | |
| DMAEA: N,N-Dimethylaminoethylacrylate | Arkema | 2439-35-2 | |
| IOA: Iso-octyl acrylate | 3M | 29590-42-9 | |
| VAc: Vinyl acetate | Celanese | 108-05-4 | |
| MAA: Methacrylic acid | Dow Chemical Company | 79-41-4 | |
| A-174: Silquest ® A-174, 3-(Trimethoxysilyl)propyl methacrylate | Momentive | 2530-85-0 | |
| EQ-C25: Ethoquad C-25, Cocoalkylmethyl[polyoxyethylene(15)] ammonium chloride | AkzoNobel Agrochemicals | 61791-10-4 | |
| V-50: 2,2'-Azobis(2-methylpropionamidine) dihydrochloride Deionized water | Wako Chemicals | 2997-92-4 | |
| GMA: glycidyl methacrylate | Dow Chemical Company | 106-91-2 | |

General Synthetic Procedure for Amphiphilic Polymers: In a clean reaction bottle, an aqueous solution of monomer, surfactant and initiator in the proportions outlined in Table 4 was prepared. The mixture was purged with nitrogen for 2 minutes. The reaction bottle was sealed and placed in a 50° C. preheated water bath with mixing mechanism. The reaction mixture was heated for 17 hours at 50° C. with mixing. The reaction mixture was analyzed by % solids analysis. By following the above procedure, each of the polymers in Table 4 was synthesized.

TABLE 4

List of Amphiphilic Polymers prepared by following the above technique

| | DMAEA-MCL (80% solids in water) | DMAEA | IOA | VAc | A-174 | GMA | EQ-C25 | V-50 | $H_2O$ |
|---|---|---|---|---|---|---|---|---|---|
| 1 | 10 | 0 | 87 | 3 | 2 | 0 | 1 | 0.5 | 122.2 |
| 2 | 10 | 0 | 87 | 3 | 0 | 2 | 1 | 0.5 | 122.2 |
| 3 | 0 | 8 | 87 | 3 | 2 | 0 | 1 | 0.5 | 122.2 |
| 4 | 0 | 8 | 87 | 3 | 0 | 2 | 1 | 0.5 | 122.2 |
| 5 | 10 | 0 | 85 | 3 | 2 | 2 | 1 | 0.5 | 122.2 |
| 6 | 0 | 8 | 85 | 3 | 2 | 2 | 1 | 0.5 | 122.2 |

The DMAEA Specimens each had a pH of 9.5-10, and none of them produced a stable emulsion polymer. The DMAEA-MCl Specimens each had a pH of ~6.5-7, and each produced a stable milky white emulsion polymer. Three Specimens (1, 2 and 5) were applied to granules and tested according to the procedures outlined below.

Procedure 6: Method for Granule Treatment: Control Specimens were prepared as described above in Example 1. The quaternary ammonium polymers (Specimens 1, 2 and 5, Table 4) were added in place of 3M Fastbond™ Insulation Adhesive 49. Refer to Table 5 for variations in the amount of the components.

Granule Water Repellency: Performed as described above in Example 1.

Granule Asphalt Wettability: Performed as described above in Example 1.

Granule to Asphalt Adhesion using the "Texas Boil" Test: Performed as described above in Example 1.

Granule to Asphalt Adhesion using the Rub Test: Performed as described above in Example 1.

Procedure 7: Granule Dust Test: A dust measurement of the treated granules was evaluated using a DustTrak™ DRX Aerosol Monitor Model 8533 available from TSI Incorporated, Shoreview, Minn. A fabricated 4.5"×3.5"×4.5" dust chamber is attached by a hose to the inlet of the DustTrak™. 400 gms of treated granules are released from a funnel into the chamber while simultaneously running the DustTrak™ for one minute. The average total dust reading is recorded in $mg/m^3$.

Results: Control Specimens (1 through 6, 18, 27 and 34) contained only BS68 as the adhesion promoter, delivered from oil, and 3M Fastbond™ Insulation Adhesive 49 as dust suppressant. Control Specimens provided a basis of comparison for the quaternary ammonium-containing species. Note that the Control Specimen treatment formulation provides adequate water repellency (60 minutes and greater) and adequate asphalt wettability (95-100%). Dust suppression for the control formulation has an average value of 15.0 $mg/m^3$. Granule adhesion for the control formulation measured by the Texas Boil test had an average value of 23.4% loss when using regular asphalt and 19.6% loss when using PPA modified asphalt.

A-ZAP alone provided significant dust suppression. Specimen 7 was indicative of the performance of A-ZAP alone on the granule surface. The dust suppression was 10.3 mg/m3, which was lower than the average of the Control Specimens, but granules with A-ZAP alone exhibited much more loss of asphalt than the Control Specimens for both regular asphalt and PPA-modified asphalt.

With the same loading and application conditions, A-ZAP provided improved dust suppression compared to 3M Fastbond™ Insulation Adhesive 49. Specimens 8 through 13 compared the effects of the Control dust suppressant, 3M Fastbond™ Insulation Adhesive 49, with A-ZAP at different loading levels, with every other factor remaining the same. At each level, the granules modified with A-ZAP exhibited greater dust suppression, and 1 lb/ton loading of 3M Fastbond™ Insulation Adhesive 49 was required to achieve the same dust suppression achievable with 0.25 lb/ton loading of A-ZAP with these treatment conditions. The combination of A-ZAP and the SILRES® BS 68 did not improve the Texas Boil asphalt loss with regular asphalt relative to the control. Specimens 14 and 15 expanded on these results at a higher loading of SILRES® BS 68. In this case, A-ZAP again showed improved dust suppression relative to the control, but the Texas Boil asphalt loss with regular asphalt relative to the control deteriorated with increasing loading of A-ZAP.

A-ZAP plus an epoxy-functional silane treatment exhibited better dust suppression, but reduced Texas boil retention relative to 3M Fastbond™ Insulation Adhesive 49 used in combination with the same silane treatment. Specimens 16-17 and 19-20 were replicates of this comparison. The Texas boil asphalt loss with PPA-modified asphalt with the 3M Fastbond™ Insulation Adhesive 49 was half that achieved with A-ZAP.

Polymers containing a quaternary amine with added BS-68 provided both excellent dust suppression and excellent Texas boil retention with PPA-modified asphalt, as demonstrated by Specimens 21 through 23. When BS-68 was not included, dust suppression was excellent, but the Texas boil retention was poor, as demonstrated by Specimens 24 through 26.

Specimens 28 and 29 served as comparative examples and demonstrated that granules treated with 3M Fastbond™ Insulation Adhesive 49, SILRES® BS 68 and an epoxy-functional silane adhesion promoter exhibited improved Texas boil asphalt loss with PPA-modified asphalt relative to the Control, but deteriorated dust suppression performance relative to the Control. Specimen 30 also served as a comparative example, with the same loading of SILRES® BS 68 and an epoxy-functional silane adhesion promoter as Specimen 28. This treatment exhibited superior dust suppression, but no evidence of improved adhesion promotion.

In Specimens 31 through 33, silane-functional polymers (Specimens 1 and 5, Table 4) were applied in combination with an epoxy-functional silane and SILRES® BS 68. These treatments provided excellent Texas boil retention with PPA-modified asphalt, at a level that was equal to that achieved with Specimens 1 and 5 with BS-68 alone (Specimens 22 and 23). These same two polymers also exhibited excellent dust suppression. The polymers having quaternary ammonium moieties that did not contain a silane functionality (Specimen 2, Specimen 31) did produce Texas boil retention that was differentiable from that provided by the epoxy-functional silane alone (Specimens 22 and 23), but also exhibited excellent dust suppression. As shown in Specimen 30, A-ZAP with the epoxy-functional silane reduced the Texas boil retention, consistent with other observations.

Specimens 35 and 36 compared granules treated with a) levels of dust suppressants A-ZAP and silane-functional polymer (Specimen 1, Table 4) that had resulted in optimal adhesion in previous testing, and b) higher levels of SILRES® BS 68. Specimen (36), which was prepared with the silane-functional polymer, exhibited both improved Texas boil asphalt retention with PPA-modified asphalt relative to Specimen 35 and relative to the Control.

TABLE 5

Results for Example 2

| Example | BS68, lb/ton | Cross L500 Oil lb/ton | 3M Fastbond ™ Insulation Adhesive 49 lb/ton | Water Repellency, min | Asphalt Wettability | Dust mg/m$^3$ | TX Boil, % Reg Asphalt Loss |
|---|---|---|---|---|---|---|---|
| Control (1) | 0.20 | 1.50 | 1.00 | 120+ | 100 | | 16.0 |
| Control (2) | 0.20 | 1.50 | 1.00 | 60+ | 100 | 5.9 | 29.0 |
| Control (3) | 0.20 | 1.00 | 1.00 | 120+ | 95 | | 26.0 |
| Control (4) | 0.20 | 1.00 | 1.00 | 120+ | 100 | | 25.5 |
| Control (5) | 0.20 | 1.00 | 1.00 | 120+ | 100 | 15.7 | 18.8 |
| Control (6) | 0.20 | 1.00 | 1.00 | 60+ | 100 | | 18.4 |
| A-ZAP 1.0 lb/ton (7) | 0.00 | 0.00 | 0.00 | 0 | 30 | 10.3 | 72.0 |
| 3M Fastbond ™ Insulation Adhesive 49 (8) | 0.10 | 0.75 | 0.25 | 90+ | 100 | 34.7 | 21.8 |
| 3M Fastbond ™ Insulation Adhesive 49 (9) | 0.10 | 0.75 | 0.50 | 90+ | 100 | 17.6 | 25.3 |
| 3M Fastbond ™ Insulation Adhesive 49 (10) | 0.10 | 0.75 | 1.00 | 90+ | 90 | 8.8 | 24.7 |
| A-ZAP 0.25 lb/ton (11) | 0.10 | 0.75 | 0.00 | 90+ | 100 | 8.9 | 24.0 |
| A-ZAP 0.5 lb/ton (12) | 0.10 | 0.75 | 0.00 | 90+ | 100 | 5.3 | 27.9 |

TABLE 5-continued

Results for Example 2

| | | | | | | | |
|---|---|---|---|---|---|---|---|
| A-ZAP: 1.0 lb/ton (13) | 0.10 | 0.75 | 0.00 | 90+ | 90 | 3.3 | |
| A-ZAP: 0.5 lb/ton A-ZAP (14) | 0.20 | 1.00 | 0.00 | 120+ | 90 | 7.9 | 21.0 |
| A-ZAP: 1.0 lb/ton A-ZAP (15) | 0.20 | 1.00 | 0.00 | 120+ | 95 | 4.9 | 34.2 |
| 3M Fastbond ™ Insulation Adhesive 49/0.1 lb/ton CoatOSil (16) | 0.10 | 1.00 | 1.00 | 120+ | 100 | 15.3 | |
| A-ZAP 0.5 lb/ton/0.1 lb/ton CoatOSil (17) | 0.10 | 1.00 | 0.00 | 120+ | 90 | 6.1 | |
| Control (18) | 0.20 | 1.00 | 1.00 | 90+ | 100 | 14.5 | |
| 3M Fastbond ™ Insulation Adhesive 49, 0.1 lb/ton CoatOSil (19) | 0.10 | 1.00 | 1.00 | 90+ | 100 | 15.0 | |
| 0.5 lb/ton A-ZAP, 0.1 lb/ton CoatOSil (20) | 0.10 | 1.00 | 0.00 | 90+ | 95 | 4.7 | |
| 1.2 lb/ton 61-2 quat epoxy (21) | 0.20 | 1.00 | 0.00 | 120+ | 100 | 3.2 | 25.8 |
| 1.2 lb/ton 61-1 quat silane (22) | 0.20 | 1.00 | 0.00 | 120+ | 100 | 2.8 | 16.5 |
| 1.2 lb/ton 61-5 quat-epoxy-silane (23) | 0.20 | 1.00 | 0.00 | 120+ | 100 | 2.7 | 19.3 |
| 1.2 lb/ton 61-2 quat epoxy (24) | 0.00 | 1.00 | 0.00 | 0.5 | 50 | 1.5 | |
| 1.2 lb/ton 61-1 quat silane (25) | 0.00 | 1.00 | 0.00 | 8 | 50 | 1.2 | |
| 1.2 lb/ton 61-5 quat-epoxy-silane (26) | 0.00 | 1.00 | 0.00 | 38 | 60 | 1.3 | |
| Control (27) | 0.20 | 1.00 | 1.00 | 120+ | 100 | 21.3 | 30.4 |
| 3M Fastbond ™ Insulation Adhesive 49, 0.1 lb/ton Geniosil (28) | 0.10 | 1.00 | 1.00 | 120+ | 100 | 25.3 | |
| 3M Fastbond ™ Insulation Adhesive 49, 0.05 lb/ton Geniosil (29) | 0.15 | 1.00 | 1.00 | 120+ | 100 | 26.9 | |
| 1 lb/ton A-ZAP, 0.1 lb/ton Geniosil (30) | 0.10 | 1.00 | 0.00 | 120+ | 100 | 5.3 | 34.6 |
| 1 lb/ton 61-2 quat epoxy, 0.1 lb/ton Geniosil (31) | 0.10 | 1.00 | 0.00 | 120+ | 100 | 5.7 | 25.1 |
| 1 lb/ton 61-1 quat silane, 0.1 lb/ton Geniosil (32) | 0.10 | 1.00 | 0.00 | 120+ | 95 | 5.2 | 18.4 |
| 1 lb/ton 61-5 quat-epoxy-silane, 0.1 lb/ton Geniosil (33) | 0.10 | 1.00 | 0.00 | 120+ | 95 | 7.6 | 19.6 |
| Control (34) | 0.20 | 1.00 | 1.00 | 90+ | 100 | 17.5 | |
| 0.5 lb/ton A-ZAP (35) | 0.20 | 1.00 | 0.00 | 90+ | 100 | 9.2 | |
| 1 lb/ton 61-1 quat silane (36) | 0.20 | 1.00 | 0.00 | 90+ | 100 | 5.4 | |
| 0.5 lb/ton 61-1 quat silane (37) | 0.20 | 0.50 | 0.00 | 60+ | 100 | 7.2 | 13.8 |
| 0.5 lb/ton 61-1 quat silane (38) | 0.10 | 0.50 | 0.00 | 60+ | 100 | 6.5 | 15.3 |

TABLE 5-continued

| | TX Boil, % PPA Asphalt Loss | Rub Test, Mean Dry Loss, gms | Rub Test, Mean Wet Loss, gms | Rub Test, Normalized Wet Loss, gms | Stain, dE |
|---|---|---|---|---|---|
| (1) | 10.0 | | | | |
| (2) | 20.0 | | | | |
| (3) | 33.1 | | | | |
| (4) | 17.8 | | | | |
| (5) | 17.8 | 0.82 | 5.05 | 1.54 | 1.2 |
| (6) | 14.2 | | | | |
| (7) | 73.0 | | | | |
| (8) | | | | | 4.7 |
| (9) | | | | | 4.3 |
| (10) | | | | | 4.5 |
| (11) | | | | | 5.5 |
| (12) | | | | | 5.6 |
| (13) | | | | | 5.9 |
| (14) | 18.9 | 0.97 | 5.00 | 1.30 | 2.2 |
| (15) | 26.1 | 0.61 | 3.68 | 1.50 | 2.5 |
| (16) | 13.4 | | | | |
| (17) | 24.6 | | | | |
| (18) | 26.2 | | | | |
| (19) | 10.2 | | | | |
| (20) | 21.9 | | | | |
| (21) | 9.7 | | | | |
| (22) | 5.2 | | | | |
| (23) | 6.7 | | | | |
| (24) | 55.1 | | | | |
| (25) | 67.3 | | | | |
| (26) | 50.0 | | | | |
| (27) | 19.9 | | | | |
| (28) | 12.2 | | | | |
| (29) | 7.1 | | | | |
| (30) | 21.3 | | | | |
| (31) | 12.3 | | | | |
| (32) | 6.7 | | | | |
| (33) | 6.4 | | | | |
| (34) | 17.8 | 0.17 | 0.98 | 1.46 | 2.9 |
| (35) | 24.5 | 0.21 | 1.10 | 1.29 | 5.7 |
| (36) | 11.3 | 0.13 | 0.41 | 0.77 | 4.2 |
| (37) | | | | | |
| (38) | | | | | |

Example 3

Compounds Containing Sulfide Functional Groups

Table 6 below lists the materials used in Example 3.

TABLE 6

| Materials used in Example 3 | | | |
|---|---|---|---|
| | Manufacturer | CAS# | Comments |
| Bis(triethoxysilylpropyl) disulfide | Gelest (Morrisville PA) | 56706-10-6 | |
| Bis(triethoxysilylpropyl) disulfide | Evonik Industries AG | 56706-10-6 | SI 266 |
| Bis(triethoxysilylpropyl) disulfide | | | Made according to Procedure 8 |
| Bis [3-(triethoxysilyl) propyl]tetrasulfide | Gelest (Morrisville PA) | 40372-72-3 | |
| trimethylolpropane tris(3-mercaptopropionate) | Sigma Aldrich (St Louis MO) | 33007-83-9 | |
| 3-mercaptopropyl triethoxysilane | Gelest (Morrisville PA) | 14814-09-6 | |
| Polydisulfide material from reaction of trimethylolpropane tris(3-mercaptopropionate) and 3-mercaptopropyl triethoxysilane | | | Made according to Procedure 9 |

TABLE 6-continued

Materials used in Example 3

| | Manufacturer | CAS# | Comments |
|---|---|---|---|
| SILRES BS68 | Wacker | 34396-03-7 | |
| | | 77-58-7 | |
| | | 67-56-1 | |
| L500 Napthenic Oil | Cross Oil & Refining (Smackover, AR) | 64742-52-5 | |
| 3M WA9300 Roofing Granules, "kiln" | | | White roofing granules |
| 3M Fastbond ™ Insulation Adhesive 49 | | | Polyacrylate adhesive |

Material Synthesis

1. Synthesis of bis(triethoxysilylpropyl)disulfide from 3-mercaptopropyl triethoxysilane. 3-Mercaptopropyl triethoxysilane (FW=238.42, 30 g, 0.1258 moles) and methylene chloride (100 g) were placed in a 250 mL round bottom flask, positioned in an ice bath, with a magnetic stir bar. Sulfuryl chloride (SO2Cl2, FW=134.96, 9.34 g, 0.0692 moles) was added into the mixture dropwise for 5 min while stirring vigorously using the magnetic stir bar. Stirring of the mixture was continued for an hour with the flask maintained in the ice bath. The reaction was dried by evaporating the solvent and the unreacted reactants using a rotavap under reduced pressure.

2. Synthesis of polysulfide material from 3-mercaptopropyl triethoxysilane and trimethylolpropane tris(3-mercaptopropionate). 3-Mercaptopropyl triethoxysilane (FW=238.42, 21.53 g, 0.09 moles), trimethylolpropane tris (3-mercaptopropionate) (FW=398.55, 10.0 g, 0.025 moles) and methylene chloride (100 g) were placed in a 250 mL round bottom flask, positioned in an ice bath, with a magnetic stir bar. Sulfuryl chloride (SO2Cl2, F.W.=134.96, 12.29 g, 0.091 moles) was added into the mixture dropwise for 5 min while stirring vigorous using the magnetic stir bar. Stirring of the mixture was continued for an hour with the flask maintained in the ice bath. The reaction was dried by evaporating the solvent and the unreacted reactants by using a rotavap under reduced pressure.

Granule Water Repellency: Performed as described above in Example 1.

Granule Asphalt Wettability: Performed as described above in Example 1.

Granule to Asphalt Adhesion using the "Texas Boil" Test: Performed as described above in Example 1.

Granule to Asphalt Adhesion using the Rub Test: Performed as described above in Example 1.

Procedure 8: Method for Granule Treatment: 1000 grams of granules were oven heated in a metal can or on a tray at 360° F. for approximately one hour. Oil and silicone were mixed in the desired proportions in a dropper bottle. About 2 to 5 times the amount needed was prepared, to ensure measurement accuracy. To achieve levels of 3M Fastbond™ Insulation Adhesive 49 of 1.0 lb/ton, 0.50 gms of 3M Fastbond™ Insulation Adhesive 49 were weighed out in a weigh dish with 15 gms of deionized water and the dish was gently shaken to mix. The granule container was removed from the oven and its contents were transferred to a metal can on a paint shaker. The shaker was turned on, and the granules were quenched with the water/3M Fastbond™ Insulation Adhesive 49 mixture. The granules were shaken for 45 seconds. The dropper bottle containing the silicone and oil was tared on a scale. The proper amount of silicone and oil mixture was added to granules by using the loss-in-weight method. The granules were shaken for a total of five minutes for specimens to be used in stain tests, or for three minutes for specimens to be used for color measurements. The contents were then removed and transferred to a 3-lb box. This was then placed in a 176° F. oven for one hour to complete curing of the treated granules.

For the following Specimens of Example 3, the disulfide component was added, in the procedure above, with oil and silicone (SILRES BS68). For each of these Specimens, the treatment consisted of 1.0 lb/ton 3M Fastbond™ Insulation Adhesive 49; 0.2 lb/ton total disulfide+SILRES BS68; 1.0 lb/ton Cross L500 Naphthenic Oil. Specimens 2 through 7 were prepared using Bis(triethoxysilylpropyl) disulfide (Gelest), Specimens 8 and 9 were prepared using Bis(triethoxysilylpropyl)disulfide (Evonik Si 266), Specimen 10 was prepared using bis(triethoxysilylpropyl)disulfide prepared from 3-mercaptopropyl triethoxysilane according to Material Synthesis 1. Specimen 11 was prepared using polysulfide material prepared from 3-mercaptopropyl triethoxysilane and trimethylolpropane tris(3-mercaptopropionate) according to Material Synthesis 2. Specimens 14 and 15 were prepared using bis[3-(triethoxysilyl)propyl] tetrasulfide (Gelest).

In specimens 8 through 12 and 16 through 18, Procedure 8 was followed except that a pail mixer was used and 5 kg batches were prepared. The ratio of disulfide/BS68 was 50/50 for specimens 8 through 11 and 15 through 17. Specimen 14 included no BS68. Control specimens 13 and 18 contained 0% disulfide.

TABLE 7

Results for Example 3

| Specimen | Description | BS68, lb/ton | Polysulfide lb/ton | Water Repellency, min | Asphalt Wettability | TX Boil, % Reg Asphalt Loss | TX Boil, % PPA Asphalt Loss |
|---|---|---|---|---|---|---|---|
| 1 | Control (0% Disulfide) | 0.20 | 0.00 | 60+ | 100 | 19.7 | 15.6 |

TABLE 7-continued

Results for Example 3

| | | | | | | | |
|---|---|---|---|---|---|---|---|
| 2 | 10/90 BS68/Disulfide | 0.02 | 0.18 | 60+ | 100 | 11.2 | 11.5 |
| 3 | 25/75 BS68/Disulfide | 0.05 | 0.15 | 60+ | 100 | 8.8 | 12.7 |
| 4 | 50/50 BS68/Disulfide | 0.10 | 0.10 | 60+ | 100 | 9.2 | 8.7 |
| 5 | 75/25 BS68/Disulfide | 0.15 | 0.05 | 60+ | 100 | 9.8 | 8.8 |
| 6 | 90/10 BS68/Disulfide | 0.18 | 0.02 | 60+ | 100 | 6.4 | 8.2 |
| 7 | 100% Disulfide | 0.00 | 0.20 | 30 | 100 | 6.9 | 11.0 |
| 8 | Disulfide/BS68 | 0.10 | 0.10 | 60+ | — | 1.8 | — |
| 9 | Disulfide | 0.00 | 0.20 | 60+ | — | 9.1 | — |
| 10 | Disulfide #3/BS68 | 0.10 | 0.10 | 60+ | — | 6.4 | — |
| 11 | Disulfide #7/BS68 | 0.10 | 0.10 | 60+ | — | 12.6 | — |
| 12 | Control (0% Disulfide) | 0.20 | 0.00 | 60+ | — | 7.5 | — |
| 13 | Control (0% Tetrasulfide) | 0.20 | 0.00 | 60+ | 100 | 13.0 | — |
| 14 | Tetrasulfide | 0.00 | 0.20 | 60+ | 100 | 8.2 | — |
| 15 | Tetrasulfide/BS68 | 0.10 | 0.10 | 60+ | 100 | 3.3 | — |
| 16 | Disulfide | 0.10 | 0.10 | 60+ | 95 | 1.6 | — |
| 17 | Tetrasulfide | 0.10 | 0.10 | 60+ | 100 | 2.7 | — |
| 18 | Control (0% Polysulfide) | 0.20 | 0.00 | 60+ | 100 | 5.6 | |

| Specimen | Rub Test, Mean Dry Loss, gms | Rub Test, Mean Wet Loss, gms | Rub Test, Normalized Wet Loss, gms |
|---|---|---|---|
| 8 | 0.41 | 1.14 | 0.70 |
| 9 | 0.26 | 0.70 | 0.68 |
| 10 | 0.87 | 1.76 | 0.51 |
| 11 | 0.48 | 1.98 | 1.03 |
| 12 | 0.24 | 0.84 | 0.89 |
| 16 | 0.35 | 1.01 | 0.72 |
| 17 | 0.09 | 0.35 | 0.93 |
| 18 | 0.10 | 0.31 | 0.81 |

Specimens 1 through 7 demonstrated that the addition of disulfide improved granule adhesion (e.g. lower Texas Boil asphalt loss) as compared to control specimen 1 with 0% disulfide. Specimens 8 through 11 demonstrate that the addition of disulfide improve performance in the normalized wet loss rub test as compared to control specimen 1 with 0% disulfide. Specimens 14 and 15 demonstrate that tetrasulfide containing granule treatments improve granule adhesion (e.g. lower Texas Boil asphalt loss) as compared to control specimen 13 with 0% tetrasulfide.

Example 4

Compounds Containing Polymeric Zirconium Compounds

Table 7 below lists the materials used in Example 4.

TABLE 8

Materials used in Example 4

| | Manufacturer | CAS# | Comments |
|---|---|---|---|
| SILRES BS68 | Wacker | 34396-03-7 77-58-7 67-56-1 | |
| L500 Napthenic Oil | Cross Oil & Refining (Smackover, AR) | 64742-52-5 | |

TABLE 8-continued

Materials used in Example 4

| | Manufacturer | CAS# | Comments |
|---|---|---|---|
| 3M WA9300 Roofing Granules, "kiln" | | | White roofing granules |
| 3M Fastbond ™ Insulation Adhesive 49 | | | Polyacrylate adhesive |
| A-ZAP | 3M (St. Paul, MN) | | As described in U.S. patent application No. 14/102,258 |
| Zirconium Acetate Solution A | MEL Chemicals (Manchester, England, UK) | 7585-20-8 | Described in WO 2009085926 A2, 36.13% solids, 21.3% ZrO2 |
| ZINPLEX 15 | Munzing Chemie GmbH (Abstatt, Germany) | 11-0004-5974-0 | Zinc oxide solution nominally containing 13.2% zinc metal ions |
| Calcium Acetate Monohydrate | J. T. Baker Chemicals Div. of Avantor Performance Materials (Center Valley, PA) | 5743-26-0 | |

Granule Water Repellency: Performed as described above in Example 1.

Granule Asphalt Wettability: Performed as described above in Example 1.

Granule to Asphalt Adhesion using the "Texas Boil" Test: Performed as described above in Example 1.

Granule to Asphalt Adhesion using the Rub Test: Performed as described above in Example 1.

Granule Dust Test: Performed as described above in Example 2.

Procedure 9: Method for Granule Treatment: 1000 grams of granules were oven heated in a metal can or on a tray at 360° F. for approximately one hour. Oil and silicone were mixed in the desired proportions in a dropper bottle. About 2 to 5 times the amount needed was prepared, to ensure measurement accuracy. To achieve levels of 3M Fastbond™ Insulation Adhesive 49 of 1.0 lb/ton, 0.50 gms of 3M Fastbond™ Insulation Adhesive 49 were weighed out in a weigh dish with 15 gms of deionized water and the dish was gently shaken to mix. The granule container was removed from the oven and its contents were transferred to a metal can on a paint shaker. The shaker was turned on, and the granules were quenched with the water/3M Fastbond™ Insulation Adhesive 49 mixture. The granules were shaken for 45 seconds. The dropper bottle containing the silicone and oil was tared on a scale. The proper amount of silicone and oil mixture was added to granules by using the loss-in-weight method. The granules were shaken for a total of five minutes for specimens to be used in stain tests, or for three minutes for specimens to be used for color measurements. The contents were then removed and transferred to a 3-lb box. This was then placed in a 176° F. oven for one hour to complete curing of the treated granules.

Procedure 10: Granule Treatment with A-ZAP and zirconium acetate: 1000 grams of granules were oven heated in a metal can or on a tray at 360° F. for approximately one hour. Oil and silicone were mixed in the desired proportions in a dropper bottle. About 2 to 5 times the amount needed was prepared, to ensure measurement accuracy. To achieve levels of A-ZAP of 0.5 lb/ton, 0.25 gms of A-ZAP were weighed out in a weigh dish with 15 gms of deionized water and the dish was gently shaken to mix. The required amount of zirconium acetate solution was added and the dish was gently shaken, to mix. The granule container was removed from the oven and its contents were transferred to a metal can on a paint shaker. The shaker was turned on, and the granules were quenched with the water/A-ZAP/zirconium acetate mixture. The granules were shaken for 45 seconds. The dropper bottle containing the silicone and oil was tared on a scale. The proper amount of silicone and oil mixture was added to granules by using the loss-in-weight method. The granules were shaken for a total of five minutes for specimens to be used in stain tests, or for three minutes for specimens to be used for color measurements. The contents were then removed and transferred to a 3-lb box. This was then placed in a 176° F. oven for one hour to complete curing of the treated granules.

Procedure 11: Granule Treatment with A-ZAP and other multivalent crosslinker: 1000 grams of granules were oven heated in a metal can or on a tray at 360° F. for approximately one hour. Oil and silicone were mixed in the desired proportions in a dropper bottle. About 2 to 5 times the amount needed was prepared, to ensure measurement accuracy. To achieve levels of A-ZAP of 0.5 lb/ton, 0.25 gms of A-ZAP were weighed out in a weigh dish with 15 gms of deionized water and the dish was gently shaken, to mix. The required amount of multivalent crosslinker solution was added and the dish was gently shaken, to mix. The granule container was removed from the oven and its contents were transferred to a metal can on a paint shaker. The shaker was turned on, and the granules were quenched with the water/A-ZAP/multivalent crosslinker mixture. The granules were shaken for 45 seconds. The dropper bottle containing the silicone and oil was tared on a scale. The proper amount of silicone and oil mixture was added to granules by using the loss-in-weight method. The granules were shaken for a total of five minutes for specimens to be used in stain tests, or for three minutes for specimens to be used for color measurements. The contents were then removed and transferred to a 3-lb box. This was then placed in a 176° F. oven for one hour to complete curing of the treated granules. Multivalent crosslinkers include ZINPLEX 15 and calcium acetate.

Specimens 1 through 8 were prepared according to Procedure 10 with 0.5 lb/ton A-ZAP, 0.2 lb/ton SILRES BS68, and 1.0 lb/ton L500 Naphthenic Oil. Specimens 9 through 17 were prepared according to Procedure 10 except 5 kg batches were prepared using a pail mixer. A-ZAP and ZrAc were applied as indicated in the table, with 0.2 lb/ton SILRES BS68, and 1.0 lb/ton L500 Naphthenic Oil. Control Specimen 17 was prepared with 1.0 lb/ton 3M Fastbond™ Insulation Adhesive 49, 0.2 lb/ton SILRES BS68, and 1.0 lb/ton L500 Napthenic Oil.

indicated in the table and with 0.2 lb/ton SILRES BS68, and 1.0 lb/ton L500 Naphthenic Oil.

Specimens 27 through 33 were prepared according to Procedure 11 with A-ZAP and ZINPLEX 15 applied as indicated in the table and with 0.2 lb/ton SILRES BS68, and 1.0 lb/ton L500 Naphthenic Oil.

TABLE 9

Results for Example 4

| Specimen | Stoichiometric Ratio | A-ZAP, lb/ton | ZrAc, lb/ton | Water Repellency, min | Asphalt Wettability | Dust Trak, mg/m$^3$ | Texas Boil, % asphalt loss |
|---|---|---|---|---|---|---|---|
| 1 | A-ZAP/ZrAC 1:0 | 0.5 | 0.000 | 60+ | 100 | 4.8 | 28.7 |
| 2 | A-ZAP/ZrAC 1:0.5 | 0.5 | 0.006 | 60+ | 100 | 5.7 | 31.1 |
| 3 | A-ZAP/ZrAC 1:1 | 0.5 | 0.013 | 60+ | 100 | 8.5 | 15.3 |
| 4 | A-ZAP/ZrAC 1:2 | 0.5 | 0.025 | 60+ | 100 | 6.5 | 21.7 |
| 5 | A-ZAP/ZrAC 1:4 | 0.5 | 0.050 | 60+ | 100 | 7.4 | 14.4 |
| 6 | A-ZAP/ZrAC 1:10 | 0.5 | 0.125 | 60+ | 100 | 7.5 | 9.1 |
| 7 | A-ZAP/ZrAC 1:20 | 0.5 | 0.250 | 60+ | 100 | 17.0 | 11.4 |
| 8 | A-ZAP/ZrAC 1:200 | 0.5 | 2.500 | 60+ | 100 | 11.4 | 11.6 |
| 9 | A-ZAP/ZrAc 1:0 | 0.5 | 0.000 | 60+ | 95 | 40.0 | 11.6 |
| 10 | A-ZAP/ZrAc 1:1 | 0.5 | 0.013 | 60+ | 95 | 46.8 | 7.1 |
| 11 | A-ZAP/ZrAc 1:2 | 0.5 | 0.025 | 60+ | 95 | 51.7 | 7.2 |
| 12 | A-ZAP/ZrAc 1:4 | 0.5 | 0.050 | 60+ | 100 | 44.5 | 3.0 |
| 13 | A-ZAP/ZrAc 1:10 | 0.5 | 0.125 | 60+ | 100 | 56.8 | 0.0 |
| 14 | A-ZAP/ZrAc 1:20 | 0.5 | 0.250 | 60+ | 95 | 79.0 | 3.0 |
| 15 | A-ZAP/ZrAc 1:200 | 0.5 | 2.500 | 60+ | 80 | 94.0 | 2.6 |
| 16 | A-ZAP/ZrAc 1:10 | 1.0 | 0.250 | 60+ | 95 | 58.7 | 4.4 |
| 17 | Control | 0.0 | 0.0 | 60+ | 100 | 54.1 | 5.6 |
| 18 | Control | 0.0 | 0.0 | 90+ | 100 | 37.2 | 10.2 |
| 19 | A-ZAP/ZrAc 1:4 | 0.5 | 0.050 | 90+ | 100 | 38.6 | 5.5 |
| 20 | A-ZAP/ZrAc 1:4 | 1.0 | 0.100 | 90+ | 90 | 17.6 | 9.7 |
| 21 | Control | 0.0 | 0.0 | 60+ | 100 | 21.0 | 13.6 |
| 22 | A-ZAP/ZrAc 1:10 | 0.5 | 0.125 | 60+ | 95 | 54.5 | 5.7 |

| Specimen | Rub Test, Mean Dry Loss, gms | Rub Test, Mean Wet Loss, gms | Rub Test, Normalized Wet Loss, gms |
|---|---|---|---|
| 9 | 0.35 | 1.23 | 0.87 |
| 10 | 0.12 | 0.42 | 0.90 |
| 11 | 0.31 | 0.68 | 0.54 |
| 12 | 0.92 | 2.28 | 0.62 |
| 13 | 1.43 | 4.04 | 0.71 |
| 14 | 1.63 | 4.57 | 0.70 |
| 15 | 0.90 | 2.62 | 0.73 |
| 16 | 0.82 | 2.39 | 0.73 |
| 17 | 0.10 | 0.31 | 0.81 |
| 18 | 0.66 | 1.91 | 0.73 |
| 19 | 0.56 | 1.16 | 0.52 |
| 20 | 0.36 | 0.60 | 0.41 |
| 21 | 0.44 | 1.66 | 0.95 |
| 22 | 0.53 | 2.08 | 0.97 |

Specimens 19 through 20 were prepared according to Procedure 10 except 5 kg batches were prepared using a pail mixer. A-ZAP and ZrAc were applied as indicated in the table, with 0.2 lb/ton SILRES BS68, and 1.0 lb/ton L500 Naphthenic Oil. Control Specimen 18 was prepared with 1.0 lb/ton 3M Fastbond™ Insulation Adhesive 49, 0.2 lb/ton SILRES BS68, and 1.0 lb/ton L500 Napthenic Oil.

Specimen 22 was prepared according to Procedure 10 except 5 kg batches were prepared using a pail mixer. A-ZAP and ZrAc were applied as indicated in the table, with 0.2 lb/ton SILRES BS68, and 1.0 lb/ton L500 Naphthenic Oil. Control Specimen 21 was prepared with 1.0 lb/ton 3M Fastbond™ Insulation Adhesive 49, 0.2 lb/ton SILRES BS68, and 1.0 lb/ton L500 Naphthenic Oil.

Specimens 23 and 24 were prepared according to Procedure 10 and Specimens 25 and 26 were prepared according to Procedure 11, with A-ZAP, ZrAc, and CaAc applied as Texas Boil data and Dust Test data of Specimens 1 through 8 suggest a window of improved performance for a coating including an A-ZAP crosslinked with zirconium acetate. At stoichiometric ratios of 1:1 to 1:200 (Specimens 3 through 8), Texas Boil asphalt loss is improved as compared to control Specimen 1. At ratios greater than 10:1, higher dust levels are observed. Improved performance in both improved adhesion and dust is particularly observed in Specimens 3 through 6 having ratios between 1:1 and 1:10.

Texas Boil data was much improved for a range of addition of zirconium acetate to the A-ZAP coating. In these Examples, improved Texas boil was observed for Specimens 9 through 16 including zirconium acetate and A-ZAP, as compared to control Specimen 17 without zirconium acetate.

Crosslinked A-ZAP compositions of Specimens 19 and 20 exhibited improved normalized wet loss results relative to control Specimen 18. Heavier 1.0 lb/ton loading of Specimen 20 significantly improved dust suppression.

TABLE 10

Results for Example 4

| Specimen | A-ZAP, lb/ton | ZrAc, lb/ton | CaAc, lb/ton | Water Repellency, min | Asphalt Wettability | Dust Trak, mg/m$^3$ | Texas Boil, % asphalt loss |
|---|---|---|---|---|---|---|---|
| 23 | 0.5 | 0.04 | 0.00 | 60+ | 100 | 5.73 | 11.78 |
| 24 | 0.5 | 0.12 | 0.00 | 60+ | 100 | 9.49 | 7.65 |
| 25 | 0.5 | 0.00 | 0.04 | 60+ | 100 | 5.94 | 21.96 |
| 26 | 0.5 | 0.00 | 0.12 | 60+ | 100 | 3.89 | 19.46 |

TABLE 11

Results for Example 4

| Specimen | A-ZAP, lb/ton | ZINPLEX 15, lb/ton | Water Repellency, min | Asphalt Wettability | Dust Trak, mg/m$^3$ | Texas Boil, % asphalt loss |
|---|---|---|---|---|---|---|
| 27 | 0.5 | 0.000 | 60+ | 100 | 6.77 | 14.1 |
| 28 | 0.5 | 0.007 | 60+ | 100 | 8.54 | 21.2 |
| 29 | 0.5 | 0.014 | 60+ | 100 | 7.12 | 23.5 |
| 30 | 0.5 | 0.029 | 60+ | 100 | 7.75 | 22.7 |
| 31 | 0.5 | 0.058 | 60+ | 100 | 5.65 | 24.7 |
| 32 | 0.5 | 0.144 | 60+ | 100 | 6.07 | 23.5 |
| 33 | 0.5 | 0.288 | 60+ | 100 | 12.4 | 21.5 |
| 34 | 0.5 | 2.880 | 60+ | 100 | 20.5 | 19.1 |

Specimens 25 and 26 including calcium acetate as an alternative multivalent cation may be viewed as comparative examples and did not demonstrate improved adhesion as measured by asphalt loss in the Texas Boil test. Similarly, Specimens 27 through 33 including a zinc oxide may be viewed as comparative examples and did not demonstrate improved adhesion as measured by asphalt loss in the Texas Boil Test.

The invention claimed is:

1. A coating composition, comprising:
an oligomeric alkylalkoxysiloxane; and
a compound comprising an electrophile moiety and an alkoxysilyl moiety, wherein the coating composition is adhesion-promoting for bonding first and second substrates together.

2. The coating composition of claim 1, wherein the electrophile moiety is an epoxy functional group.

3. The coating composition of claim 1, wherein the electrophile moiety comprises a sulfide functional group.

4. The coating composition of claim 1, wherein the electrophile moiety comprises a polysulfide functional group.

5. The coating composition of claim 1, wherein the electrophile moiety comprises a sulfide selected from the group consisting of bis(triethoxysilylpropyl) disulfide and bis [3-(triethoxysilyl) propyl]tetrasulfide.

6. The coating composition of claim 1, further comprising an acrylic polymer including a quaternary ammonium moiety.

7. A roofing granule comprising:
a base roofing granule; and
a coating on the base granule, the coating comprising the coating composition of claim 1.

8. The roofing granule of claim 7, wherein the electrophile moiety is an epoxy functional group.

9. The roofing granule of claim 7, wherein the electrophile moiety comprises a sulfide functional group.

10. The coating composition of claim 7, wherein the electrophile moiety comprises a polysulfide functional group.

11. A construction material, comprising:
a substrate;
an asphalt coating on the substrate; and
a plurality of granules partially embedded in the asphalt, the granules each comprising a base granule and the coating composition of claim 1 at least partially between the base granule and the asphalt coating.

12. The construction material of claim 11, wherein the electrophile moiety is an epoxy functional group.

13. The construction material of claim 11, wherein the electrophile moiety is a sulfide functional group.

14. The coating composition of claim 11, wherein the electrophile moiety comprises a polysulfide functional group.

15. The construction material of claim 11, wherein the electrophile moiety comprises a sulfide selected from the group consisting of bis(triethoxysilylpropyl) disulfide and bis [3-(triethoxysilyl) propyl]tetrasulfide.

16. The construction material of claim 11, wherein the asphalt comprises polyphosphoric acid.

17. The coating composition of claim 1 wherein the first substrate is asphalt and the second substrate is a roofing granule.

* * * * *

UNITED STATES PATENT AND TRADEMARK OFFICE
CERTIFICATE OF CORRECTION

PATENT NO. : 10,703,927 B2
APPLICATION NO. : 15/302870
DATED : July 7, 2020
INVENTOR(S) : Mahfuza Ali It is certified that error appears in the above-identified patent and that said Letters Patent is hereby corrected as shown below:

On the Title Page

Column 2
Line 1, delete "McGinty" and insert -- Mc Ginty --, therefor.

In the Specification

Column 4
Line 63, after "manner" insert -- . --.
Line 67, delete "epoxidization," and insert -- epoxidation, --, therefor.

Column 5
Lines 26-27, delete "epoxidization." and insert -- epoxidation. --, therefor.

Column 6
Line 16, delete "epoxydized" and insert -- epoxidized --, therefor.
Line 20, delete "epoxydized" and insert -- epoxidized --, therefor.

Column 7
Line 47, delete "3',4' epoxycyclohexane" and insert -- 3',4'-epoxycyclohexane --, therefor.

Column 8
Line 20, delete "triethoxl" and insert -- triethoxy --, therefor.
Line 22, delete "stoichometric" and insert -- stoichiometric --, therefor.
Line 29, delete "stoichometric" and insert -- stoichiometric --, therefor.

Column 10
Line 28, after "functionality" insert -- . --.

Signed and Sealed this
Fifteenth Day of December, 2020

Andrei Iancu
*Director of the United States Patent and Trademark Office*

Column 12
Line 55, delete "azobisbutyrylnitrile" and insert -- azobisisobutyronitrile --, therefor.

Column 13
Line 24, delete "demethyldioctadecylammonium" and insert -- dimethyldioctadecylammonium --, therefor.
Line 62, delete "lauroamphacetate)." and insert -- lauroamphoacetate). --, therefor.

Column 17
Line 15, after "art" insert -- . --.

Column 19
Line 49, delete "$Ti_xZr_{(1-x)}O_2$," and insert -- $Ti_xZr_{(1-x)}O_2$, --, therefor.

Columns 21-22
Line 53, delete "Napthenic" and insert -- Naphthenic --, therefor.

Column 23
Line 41, delete "napthenic" and insert -- naphthenic --, therefor.

Columns 25-26
Line 17, delete "GelestGlycidoxypropyl" and insert -- Gelest Glycidoxypropyl --, therefor.
Line 59, delete "Napthenic" and insert -- Naphthenic --, therefor.

Column 27-28
Line 40, delete "$H_20$" and insert -- $H_2O$ --, therefor.

Column 35
Line 7, delete "Napthenic" and insert -- Naphthenic --, therefor.

Column 37
Line 53, delete "Table 7" and insert -- Table 8 --, therefor.
Line 60, delete "Napthenic" and insert -- Naphthenic --, therefor.

Column 41
Line 6, delete "Napthenic" and insert -- Naphthenic --, therefor.
Line 57, delete "Napthenic" and insert -- Naphthenic --, therefor.
Line 64, delete "Napthenic" and insert -- Naphthenic --, therefor.

In the Claims

Column 44
Line 9, in Claim 5, delete "bis [3-(triethoxysilyl) propyl]tetrasulfide." and insert
-- bis[3-(triethoxysilyl)propyl]tetrasulfide. --, therefor.
Line 42, in Claim 15, delete "bis [3-(triethoxysilyl) propyl]tetrasulfide." and insert
-- bis[3-(triethoxysilyl)propyl]tetrasulfide. --, therefor.